(12) United States Patent
Yeung et al.

(10) Patent No.: US 9,077,014 B2
(45) Date of Patent: Jul. 7, 2015

(54) SELF-HUMIDIFYING MEMBRANE AND SELF-HUMIDIFYING FUEL CELL

(75) Inventors: King Lun Yeung, Clear Water Bay (HK); Wei Han, Sai Kung (HK)

(73) Assignee: The Hong Kong University of Science and Technology, Kowloon, Hong Kong (CN)

( * ) Notice: Subject to any disclaimer, the term of this patent is extended or adjusted under 35 U.S.C. 154(b) by 62 days.

(21) Appl. No.: 13/435,958
(22) Filed: Mar. 30, 2012

(65) Prior Publication Data

US 2012/0251903 A1 Oct. 4, 2012

Related U.S. Application Data

(60) Provisional application No. 61/457,456, filed on Apr. 1, 2011.

(51) Int. Cl.
 *H01M 4/02* (2006.01)
 *H01M 8/10* (2006.01)

(52) U.S. Cl.
 CPC .......... *H01M 8/1023* (2013.01); *H01M 8/1025* (2013.01); *H01M 8/1051* (2013.01); *H01M 8/1067* (2013.01); *H01M 2008/1095* (2013.01); *Y02E 60/521* (2013.01)

(58) Field of Classification Search
 CPC .................. H01M 2008/1095; H01M 8/1023; H01M 8/1025; H01M 8/1051; H01M 8/1067; H01M 8/04291; Y02E 60/521
 USPC ......... 429/413, 475, 477, 481–483, 492–494, 429/532, 535
 See application file for complete search history.

(56) References Cited

U.S. PATENT DOCUMENTS

| | | | |
|---|---|---|---|
| 5,539,002 A * | 7/1996 | Watanabe | 521/27 |
| 6,207,312 B1 | 3/2001 | Wynne et al. | |
| 2002/0058172 A1 | 5/2002 | Datz et al. | |
| 2004/0241531 A1 | 12/2004 | Biegert et al. | |
| 2005/0053821 A1 | 3/2005 | Jang | |
| 2005/0214615 A1 | 9/2005 | Nuber et al. | |
| 2005/0221143 A1 | 10/2005 | Kwon et al. | |
| 2006/0003195 A1 | 1/2006 | Noh | |
| 2006/0166069 A1 | 7/2006 | Min et al. | |
| 2007/0092777 A1 * | 4/2007 | Zhamu et al. | 429/33 |
| 2007/0110649 A1 * | 5/2007 | Kusakabe et al. | 423/210 |
| 2007/0141237 A1 * | 6/2007 | Okiyama et al. | 427/115 |
| 2009/0000475 A1 * | 1/2009 | Fekety et al. | 95/105 |

(Continued)

OTHER PUBLICATIONS

S. M. Haile, D. A. Boysen, C. R. I. Chisholm and R. B. Merle, "Solid acids as fuel cell electrolytes", Nature, 2001, 410, 910.

(Continued)

*Primary Examiner* — Patrick Ryan
*Assistant Examiner* — Ben Lewis
(74) *Attorney, Agent, or Firm* — Nath, Goldberg & Meyer; Jerald L. Meyer; Stanley N. Protigal

(57) ABSTRACT

A self-humidifying fuel cell is made by preparing a porous substrate, coating the substrate with a zeolitic material and filling the pores with a proton-conducting material. The coating of the substrate includes selecting a zeolitic material, and applying coating on the pore walls and surface of the porous substrate, to form zeolitic material-coated pores. The resulting composite material is used as a self-humidifying proton-conducting membrane in a fuel cell.

14 Claims, 15 Drawing Sheets

(56) References Cited

U.S. PATENT DOCUMENTS

2009/0092880 A1* 4/2009 Kim et al. .................... 429/33
2010/0304204 A1* 12/2010 Routkevitch et al. ......... 429/122

OTHER PUBLICATIONS

J. H. Piao, S. J. Liao and Z. X. Liang,"A novel cesium hydrogen sulfate-zeolite inorganic composite electrolyte membrane for polymer electrolyte membrane fuel cell application", J. Power Sources, 2009, 193, 483.

W. H. J. Hogarth, J. C. D. Da Costa, J. Drennan and G. Q. Lu, "Proton conductivity of mesoporous sol-gel zirconium phosphates for fuel cell applications", J. Mater. Chem., 2005, 15, 754.

S. H. Kwak, T. H. Yang, C. S. Kim and K. H. Yoon, "The effect platinum loading in the self-humidifying polymer electrolyte membrane on water uptake", J. Power Sources, 2003, 118, 200.

M. Watanabe, H. Uchida and M. Emori, "Analyses of Self-Humidification and Suppression of Gas Crossover in Pt-Dispersed Polymer Electrolyte Membranes for Fuel Cells", J. Electrochem. Soc., 1998, 145, 1137.

C. Wang, Z. X. Liu, Z. Q. Mao, J. M. Xu and K. Y. Ge, "Preparation and evaluation of novel self-humidifying Pt/PFSA composite membrane for PEM fuel cell", Chem. Eng. J., 2005, 112, 87.

F. Q. Liu, B. L. Yi, D. M. Xing, J. R. Yu, Z. J. Hou and Y. Z. Fu, "Development of novel self-humidifying composite membranes for fuel cells", J. Power Sources, 2003, 124, 81.

B. Yang, Y. Z. Fu and A. Manthiram, "Operation of thin Nafion-based self-humidifying membranes in proton exchange membrane fuel cells with dry H2 and O2", J. Power Sources, 2005, 139, 170.

Y. Zhang, H. M. Zhang, X. B. Zhu and Y. M. Liang, "A Low-Cost PTFE-Reinforced Integral Multilayered Self-Humidifying Membrane for PEM Fuel Cells", Electrochem. Solid-State Lett., 2006, 9, A332.

H. K. Lee, J. I. Kim J. H. Park and T. H. Lee, "A study on self-humidifying PEMFC using Pt—ZrP—Nafion composite membrane", Electrochim. Acta, 2004, 50, 761.

Y. Zhang, H. M. Zhang, X. B. Zhu and C. Bi, "Promotion of PEM Self-Humidifying Effect by Nanometer-Sized Sulfated Zirconia-Supported Pt Catalyst Hybrid with Sulfonated Poly(Ether Ether Ketone)", J. Phys. Chem. B, 2007, 111, 6391.

L. Wang, D. M. Xing, Y. H. Liu, Y. H. Cai, Z. G. Shao, Y. F. Zhai, H. X. Zhong, B. L. Yi and H. M. Zhang, "Pt/SiO2 catalyst as an addition to Nafion/PTFE self-humidifying composite membrane", J. Power Sources, 2006, 161, 61.

H. Hagihara, H. Uchida and M. Watanabe, "Preparation of highly dispersed SiO2 and Pt particles in Nafion 112 for self-humidifying electrolyte membranes in fuel cells", Electrochim. Acta, 2006, 51, 3979.

C. Wang, Z. Q. Mao, J. M. Xu and X. F. Xie, "Study of Novel Self-humidifying PEMFC with Nano-TiO2-based Membrane", Key Eng. Mater., 2005, 280-283, 899.

H. Uchida, Y. Ueno, H. Hagihara and M. Watanabe, "Self-Humidifying Electrolyte Membranes for Fuel Cells", J. Electrochem. Soc., 2003, 150, A57.

X. B. Zhu, H. M. Zhang, Y. Zhang, Y. M. Liang, X. L. Wang and B. L. Yi, "An Ultrathin Self-Humidifying Membrane for PEM Fuel Cell Application: Fabrication, Characterization, and Experimental Analysis", J. Phys. Chem. B, 2006, 110, 14240.

W. J. Zhang, M. K. S. Li, P. L. Yue and P. Gao, "Exfoliated Pt-Clay/Nafion Nanocomposite Membrane for Self-Humidifying Polymer Electrolyte Fuel Cells", Langmuir, 2008, 24, 2663.

D. H. Son, R. K. Sharma, Y. G. Shul and H. Kim, "Preparation of Pt/zeolite-Nafion composite membranes for self-humidifying polymer electrolyte fuel cells", J. Power Sources, 2007, 165, 733.

H. Yahiro, Y. Konda and G. Okada, "Conductivity of zeolite/poly(tetrafluoroethylene) composite membrane in the presence of water vapor", Chem. Phys., 2003, 5, 620.

T. Sancho, J. Soler and M. P. Pina, "Conductivity in zeolite-polymer composite membranes for PEMFCs", J. Power Sources, 2007, 169, 92.

Carbone, A. Sacca, I. Gatto, R. Pedicini and E. Passalacqua, "Investigation on composite S-PEEK/H-BETA MEAS for medium temperature PEFC", Int. J. Hydrogen Energy, 2008, 33, 3153.

M. I. Ahmad, S. M. J. Zaidi and S. U. Rahman, "Proton conductivity and characterization of novel composite membranes for medium-temperature fuel cells", Desalination, 2006, 193, 387.

S. C. Mu, X. E. Wang, H. L. Tang, P. G. Li, M. Lei, M. Pan and R. Z. Yuan, "A Self-Humidifying Composite Membrane with Self-Assembled Pt Nanoparticles for Polymer Electrolyte Membrane Fuel Cells", J. Electrochem. Soc., 2006, 153, A1868.

Y. H. Liu, T. Nguyen, N. Kristian, Y. L. Yu and X. Wang, "Reinforced and self-humidifying composite membrane for fuel cell applications", J. Membr. Sci., 2009, 330, 357.

X. B. Zhu, H. M. Zhang, Y. M. Liang, Y. Zhang and B. L. Yi, "A Novel PTFE-Reinforced Multilayer Self-Humidifying Composite Membrane for PEM Fuel Cells", Electrochem. Solid-State Lett., 2006, 9, A49.

H. Nishimura and T. Yamaguchi, "Performance of a Pore-Filling Electrolyte Membrane in Hydrogen—Oxygen PEFC", Electrochem. Solid-State Lett., 2004, 7, A385.

P. Bocchetta, F. Conciauro and F. Di Quarto, "Nanoscale membrane electrode assemblies based on porous anodic alumina for hydrogen—oxygen fuel cell", J. Solid State Electrochem., 2007, 11, 1253.

Au L. T. Y., Ariso C. T. and Yeung K. L., "Preparation of supported Sil-1, TS-1 and VS-1 membranes Effects of Ti and V metal ions on the membrane synthesis and permeation properties", J. Membr. Sci., 2009, 183, 269.

\* cited by examiner

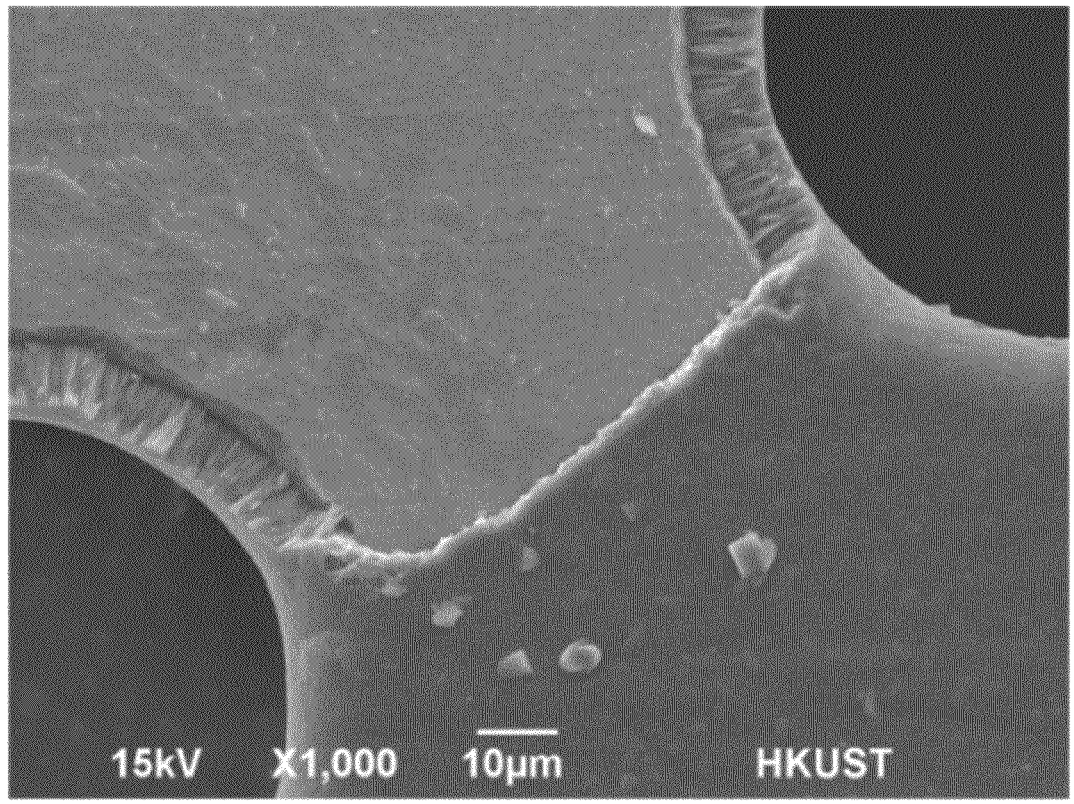
*Fig. 12A*
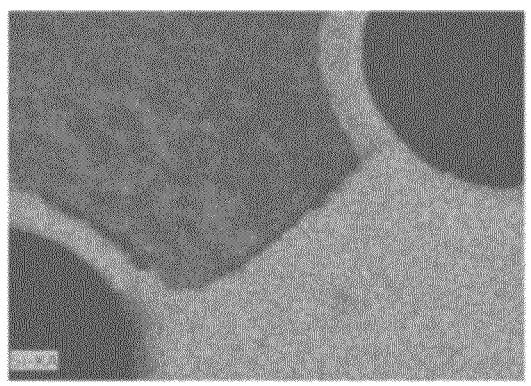 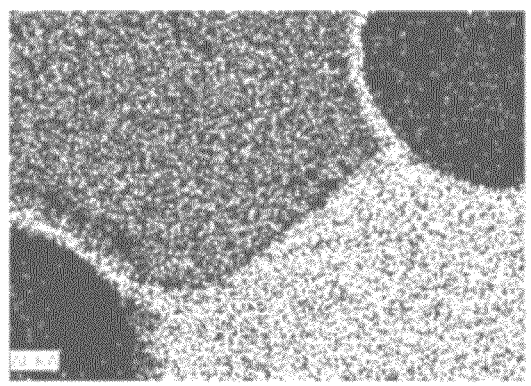
*Fig. 12B*　　　*Fig. 12C*

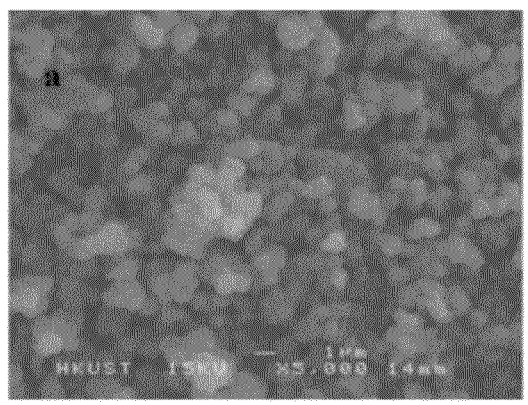
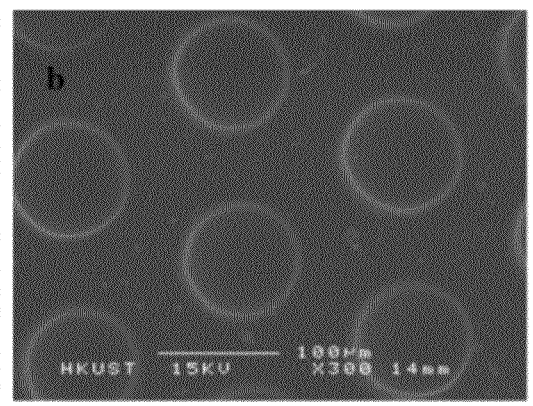
Fig. 15A          Fig. 15B
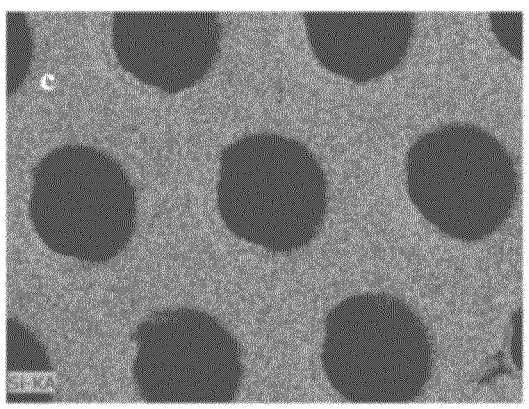
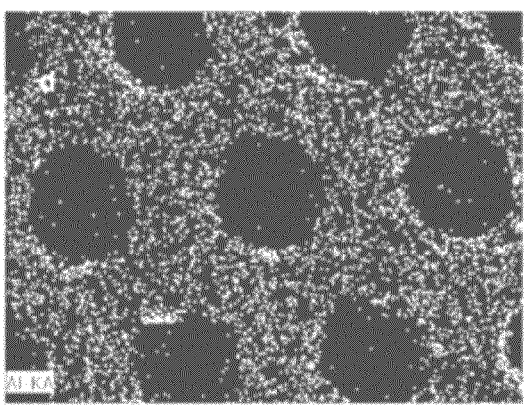
Fig. 15C          Fig. 15D
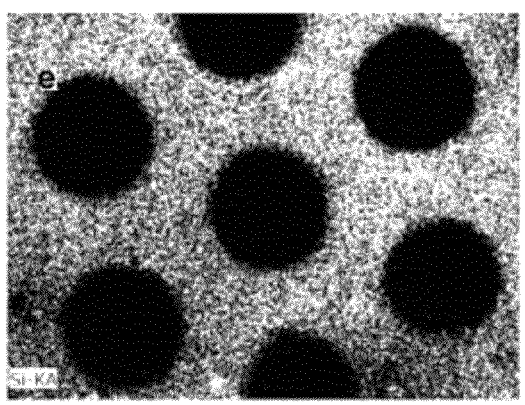
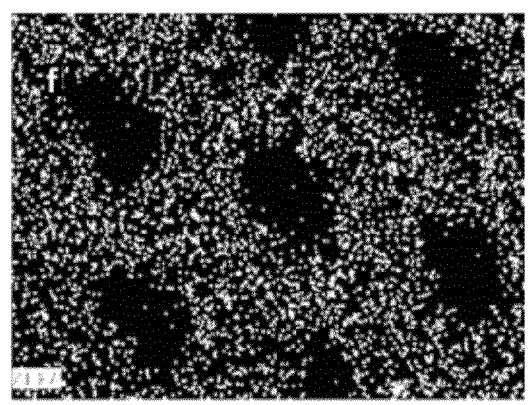
Fig. 15E          Fig. 15F

SELF-HUMIDIFYING MEMBRANE AND SELF-HUMIDIFYING FUEL CELL

RELATED APPLICATION(S)

The present patent application claims priority to U.S. Provisional Patent Application No. 61/457,456 filed 1 Apr. 2011, which is assigned to the assignee hereof and filed by the inventors hereof and which is incorporated by reference herein.

BACKGROUND

1. Field

The present disclosure relates to self-humidifying Proton Exchange Membrane Fuel Cell (PEMFC) and in particular, to the design, preparation and properties of proton-conducting composite membrane confined in a zeolite, zeotype and/or molecular sieve-coated porous substrate.

2. Background

The perfluorosulphonic acid (PFSA) polymer such as Nafion from DuPont® is the most common polymer electrolyte membrane used in a Proton Exchange Membrane Fuel Cell (PEMFC) due to its high proton conductivity and excellent long-term stability under a fully hydrated condition. (Nafion is a registered trademark of E.I. duPont de Nemours.) The PFSA polymer loses mechanical and dimensional stabilities at high temperature due to its low glass transition temperature, which restricts the operating temperature of PEMFC below 80° C. The low operating temperature brings many problems including greater sensitivity to fuel impurities (e.g., CO, $H_2S$) and complicated heat and water management. The proton conductivity of PFSA polymer also suffers a sharp drop under low membrane hydration, resulting in poor performance. Therefore, external humidification equipment is often necessary when using PFSA polymer, which complicates the system design and operation, and lowers the overall energy efficiency.

Many attempts have been made to achieve operation without humidification, including:
- new membrane structure design
- new proton conductor operated under low humidity and high temperature
- self-humidifying electrolyte membrane based on PFSA polymer, e.g., zeolite-Nafion composite membrane.

SUMMARY

A self-humidifying fuel cell is produced by using proton-conducting material confined in zeolitic material-coated porous substrate as electrolyte membrane. A porous substrate is prepared and coated with a zeolitic material by applying the coating on pore walls and surface of the porous substrate, to form zeolitic material-coated pores. The zeolitic material may consist of one or more of zeolites, molecular sieves and zeotypes. The zeolitic material-coated pores are filled with at least one proton-conducting material to form a structure for a self-humidifying membrane. The structure is then activated.

BRIEF DESCRIPTION OF THE DRAWINGS

FIG. 1A shows the formation of a confined zeolite-Nafion composite membrane. FIG. 1B shows a procedure for casting and drying.

FIGS. 2A and 2B are stainless steels with different porous structures; FIGS. 2C and 2D are ceramics with different porous structures; FIGS. 2E and 2F are plastics with different porous structures.

(FIGS. 7A, 7C) silicalite-1 (Sil-1)-coated SSM; (FIGS. 7B, 7D) calcined Sil-1-coated SSM and different Nafion precursors: (FIGS. 7A, 7B) Nafion in water and isopropanol; (FIGS. 7C, 7D) Nafion in water and 1,2-propanediol. Silicalite-1 (Sil-1) is pure silica MFI-type zeolite. MFI is a zeolite framework type that is defined by the Structure Commission of the International Zeolite Association.

FIGS. 12A-12C are SEM and energy-dispersive X-ray (EDX) elemental mapping images of ZSM-5/Sil-1 dual layer-coated SSM.

FIGS. 15A-15F are SEM and EDX elemental mapping images of Pt/HY nanoparticle (Np), Pt/HY Np/Sil-1-coated SSM and Nafion/Pt/HY Np/Sil-1-coated SSM.

DETAILED DESCRIPTION

Overview

A self-humidifying electrolyte membrane is formed by confinement of a proton-conducting polymer within a zeolite, zeotype and/or molecular sieve-coated porous substrate. In an example configuration, the zeolite, zeotype and/or molecular sieve is distributed uniformly and attached firmly on the pore walls and surface of the porous substrate. In another example, a proton-conducting polymer completely fills the coated porous substrate. The zeolite, zeotype and/or molecular sieve regulates the water within the self-humidifying membrane through adsorption of reaction generated water and/or catalytic formation of water. The confinement of the proton-conducting polymer within the zeolite, zeotype and/or molecular sieve-coated porous substrate limits the shrinkage and swelling of the material caused by temperature changes and thermal effects, thereby resulting in improved mechanical and dimensional stabilities at high temperature. Furthermore, the confinement also induces observable rearrangement in the polymer chain and functional group conformation within the pores depending on the confinement volume.

In one example of a method to produce the self-humidifying membrane, the preparation includes the following preparation steps:

(a) coating of zeolite, molecular sieve or zeotype material on the pore walls and surface of the porous substrate;
(b) filling the pores of the porous substrate with a proton-conducting polymer; and
(c) activating the self-humidifying membrane.

"Activating", as used herein, means the process of removing solvents in proton-conducting polymer precursors and porous structures of zeolites, molecular sieves or zeotype materials, in order to make the membrane self-humidifying.

It is also desired to provide a method for constructing and fabricating a self-humidifying fuel cell. In an example configuration, the fuel cell includes of self-humidifying membrane assembled into a membrane-electrode assembly.

Manufacturing Techniques

A. Preparation of Zeolitic Material-Coated Porous Substrate

Figure 1A:
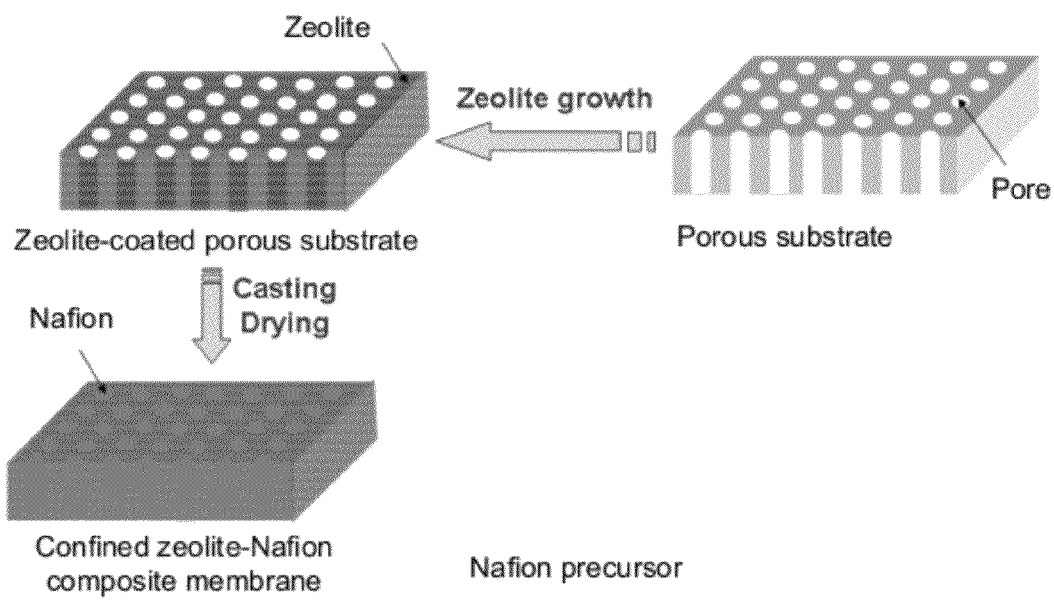
FIGS. 1A and 1B are schematic diagrams showing a preparation procedure for self-humidifying membrane.
Figure 1B:
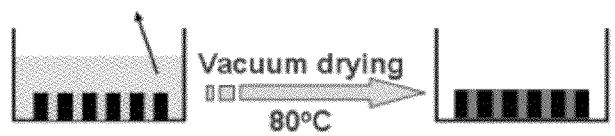

FIGS. 1A and 1B are schematic diagrams showing a preparation procedure for a self-humidifying membrane. FIG. 1A shows the formation of a confined zeolite-Nafion composite membrane. The process includes preparation of a self-humidifying membrane by confinement of a proton-conducting polymer within a zeolite, molecular sieve or zeotype-coated porous substrate. The process involves (1) zeolitic material coating, (2) pore filling with a proton-conducting polymer and (3) membrane activation. Multiple different procedures may be used for the preparation of zeolite, molecular sieve and zeotype coatings on porous substrates using any of direct hydrothermal synthesis method, seeding and regrowth method, surface grafting method and dip-coating method. FIG. 1B shows a procedure for casting and drying.

(a) Preparation of Sil-1-Coated SSM (Direct Synthesis Method)

Figure 2A:
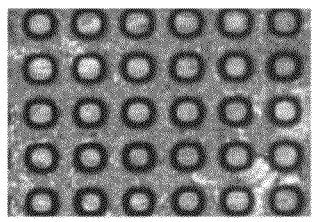
FIGS. 2A-2F are SEM images of porous stainless steel, ceramic and plastic substrates.
Figure 2C:
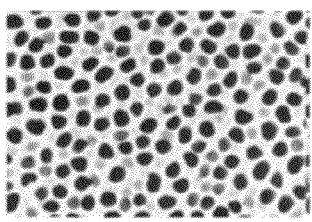
Figure 2E:
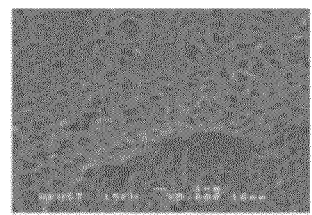
Figure 2B:
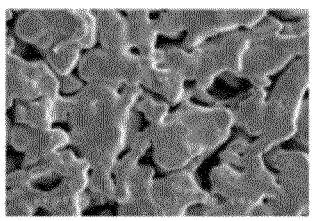
Figure 2D:
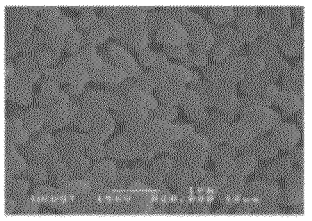
Figure 2F:
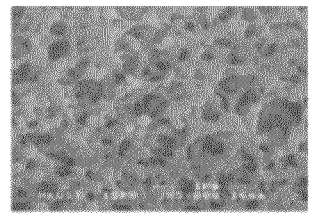

FIGS. 2A-2F are SEM images of porous stainless steel (FIGS. 2A and 2B), ceramic (FIGS. 2C and 2D) and plastic substrates (FIGS. 2E and 2F). The SSM shown in FIG. 2A was cleaned in a series of washing steps designed to remove dirt (i.e., using detergent water), grease and oil (i.e., using acetone), solvent (i.e., using alcohol) and oxides (i.e., using mineral acid, for example, HCl), before rinsing with water and drying. The synthesis solution of Sil-1 was prepared from silica precursor and structure directing agent (SDA) dissolved in water. A typical synthesis mixture has molar ratio of 1 $SiO_2$:0.1-5 SDA: 500-40,000$H_2O$. The substrate was immersed in the synthesis solution and aged overnight before placing in an autoclave vessel. The synthesis was carried out at 100-200° C. for 12-100 hours. Ten micron thick Sil-1 was deposited on the SSM from synthesis solution with molar composition of 1 $SiO_2$:2$Na_2O$:0.5 $TPA_2O$:600$H_2O$ at 175° C. for 24 hours. (TPA is tetrapropylammonium.) Porous Sil-1 was obtained after air calcination at 550° C. for at least 2 hours.

(b) Preparation of MFI-Coated SSM (Direct Synthesis Method)

The SSM was cleaned in a series of washing steps designed to remove dirt (i.e., using detergent water), grease and oil (i.e., using acetone), solvent (i.e., using alcohol) and oxides (i.e., using mineral acid (HCl)), before rinsing with water and drying. The MFI zeolite synthesis solution was prepared from silica precursor and structure directing agent dissolved in water. ZSM-5, titanium silicalite-1 (TS-1) and vanadium silicalite-1 (VS-1) were prepared with the addition of aluminum, titanium and vanadium precursor, respectively. A typical synthesis mixture has molar ratio of 1 $SiO_2$:y$MO_x$:0.01-0.5 SDA: 20-2,000$H_2O$. The substrate was immersed in the synthesis solution and aged overnight before placing in an autoclave vessel. The synthesis was carried out at 100-200° C. for 12-100 hours. Ten micron thick ZSM-5 was prepared from 1 $SiO_2$:0.01 $Al_2O_3$:0.06 $TPA_2O$:40$H_2O$ at 175° C. for 24 hours. (TPA is tetrapropylammonium.) Ten micron thick TS-1 was prepared from 1 $SiO_2$:0.01 TEOT: 0.06 $TPA_2O$:40$H_2O$ at 175° C. for 24 hours. (TEOT is tetraethyl orthotitanate.) Ten micron thick VS-1 was prepared from 1 $SiO_2$:0.01 $VOSO_4$:0.06 $TPA_2O$:40$H_2O$ at 175° C. for 24 hours. ($VOSO_4$ is vanadyl sulfate salt.) Porous MFI were obtained after air calcination at 550° C. for at least 2 hours.

(c) Preparation of Sil-1-Coated SSM (Seeding and Regrowth Method)

Figure 3A:
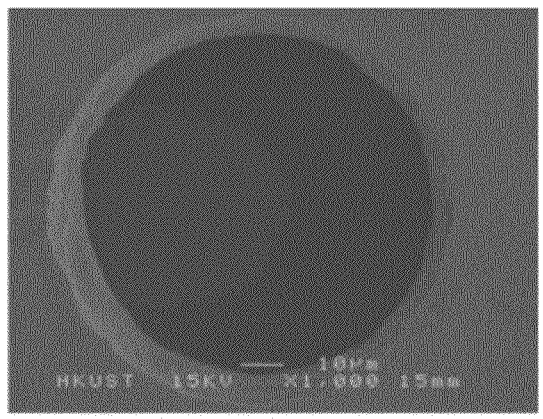
FIGS. 3A and 3B are SEM images of stainless steel mesh (SSM) seeded with zeolite crystal particles.
Figure 3B:
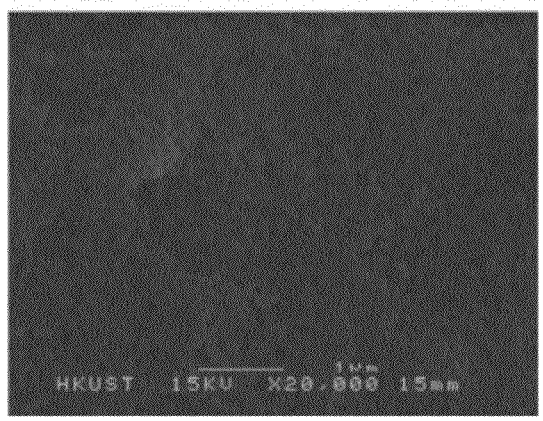

FIGS. 3A and 3B are SEM images of SSM seeded with zeolite crystal particles. The SSM fabricated by photochemical etching process displays regular pores of 70-110 micron diameter. The zeolite seeds had a diameter of 100 nm and were uniformly coated on the SSM surface. The seeds were selected to promote zeolite deposition and growth on the surface. The SSM was cleaned in a series of washing steps designed to remove dirt (i.e., using detergent water), grease and oil (i.e., using acetone), solvent (i.e., using alcohol) and oxides (i.e., using mineral acid (HCl)), before rinsing with water and drying. The clean SSM was sequentially dipped in 1 vol. % 3-mercaptopropyl trimethoxysilane in ethanol for 15 min and 1.6 wt. % TPA-Sil-1 seeds in water for 30 sec, followed by drying at 100° C. for 15 min. The processes of dipping in seeds and drying were repeated at least twice. Sil-1 was grown on the seeded SSM from synthesis solutions with molar ratio of 1 $SiO_2$:0.1-5 SDA: 200-20,000$H_2O$. A typical synthesis solution was prepared by adding drop by drop 3.4 ml of tetraethyl orthosilicate (TEOS) into a mixture of 1.9 ml of 1 mol/l tetrapropylammonium hydroxide (TPAOH) aqueous solution and 68.5 ml of DDI water, followed by stirring at room temperature for 24 hours. Seeded SSM was positioned vertically in a Teflon® holder. (Teflon is a registered trademark of E.I. duPont de Nemours.) Sil-1 synthesis solution and the holder with seeded SSM were transferred into Teflon®-lined stainless-steel autoclave and hydrothermal-treated at 130° C. for 48 hours. Porous Sil-1 was obtained after air calcination at 550° C. for at least 2 hours.

Figure 4A:
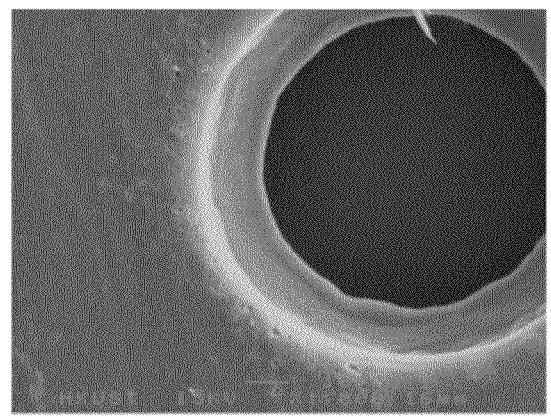
FIGS. 4A and 4B are SEM images of SSM with grown zeolite coating on its pore walls and surface.
Figure 4B:
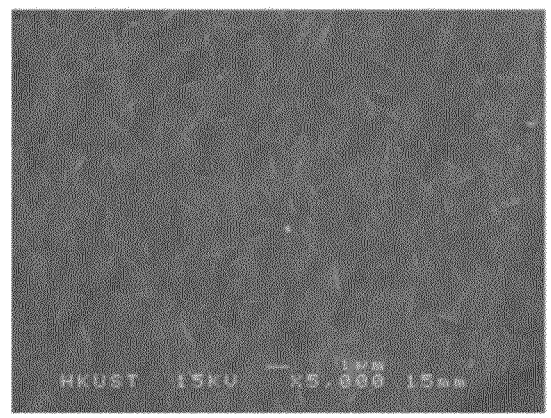

FIGS. 4A and 4B present SEM images of Sil-1-coated SSM, showing SEM images of SSM with grown zeolite coating on its pore walls and surface. The zeolite in the sample is pure silica Sil-1 and it forms a well-intergrown film on the SSM substrate.

Figure 5:
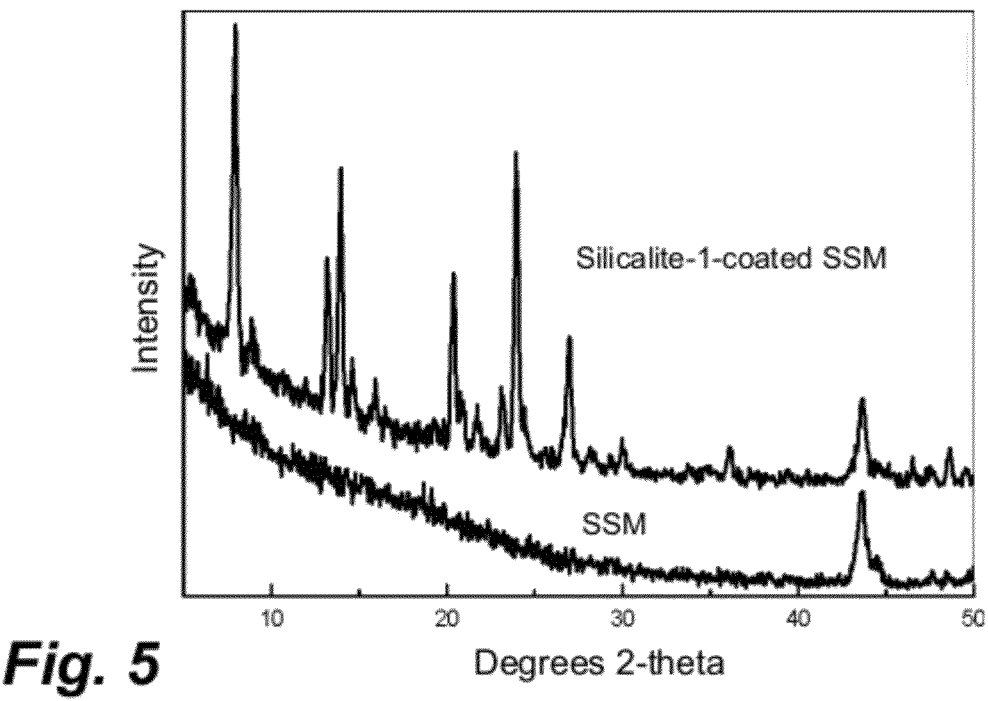
FIG. 5 is a graph showing X-ray diffraction (XRD) patterns of the SSM and zeolite-coated SSM.

FIG. 5 shows X-ray diffraction (XRD) patterns of SSM and Sil-1-coated SSM. The XRD pattern of Sil-1-coated SSM shows typical diffraction pattern of MFI zeolite and analysis indicates that the Sil-1 coating has a preferred (101) crystallographic orientation.

Figure 6:
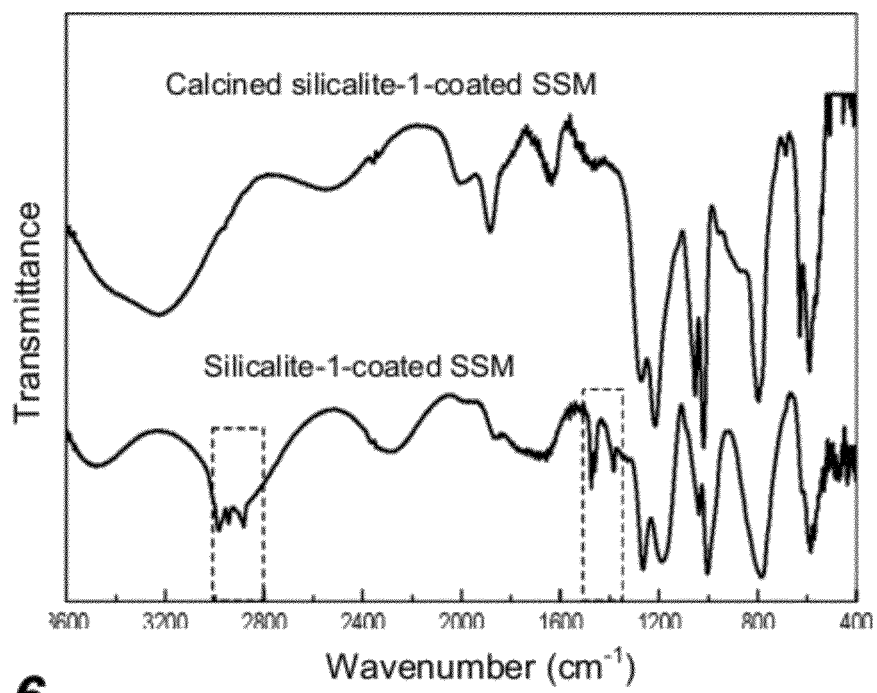
FIG. 6 is a graph showing Fourier transform infrared (FTIR) spectra of zeolite-coated SSM before and after air calcination.
Figure 7A:
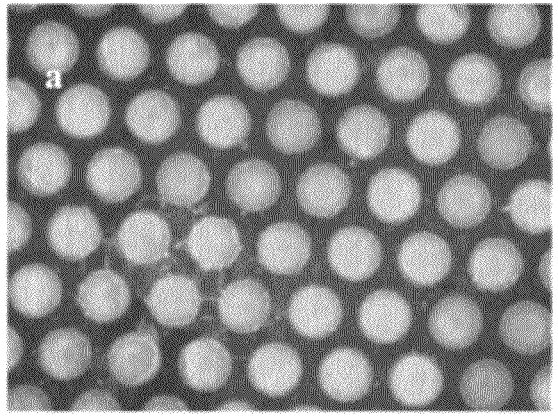
FIGS. 7A-7D are fluorescence microscopy images of self-humidifying membranes prepared from different substrates.
Figure 7B:
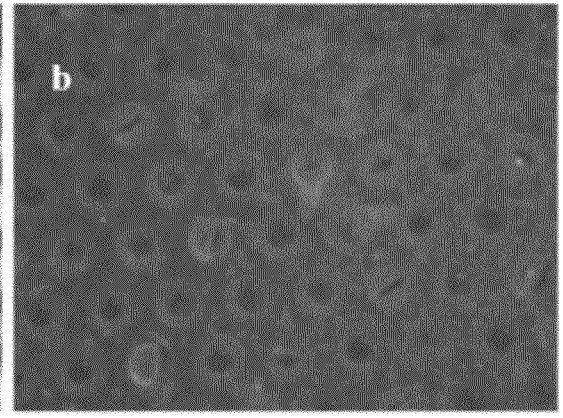
Figure 7C:
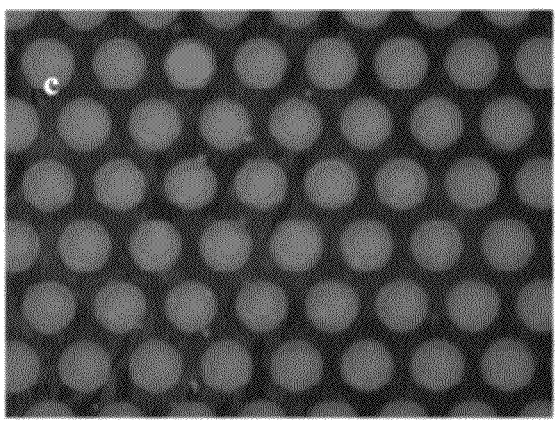
Figure 7D:
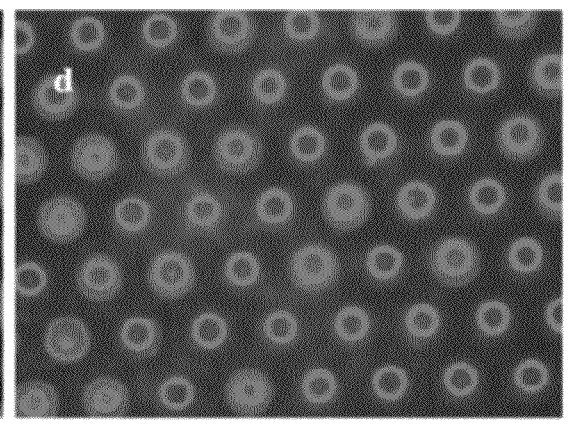

FIG. 6 shows Fourier transform infrared (FTIR) spectra of Sil-1-coated SSM before and after air calcination. The bands located in the range of 1350-1500 $cm^{-1}$ and 2800-3000 $cm^{-1}$ that originate from the structure directing agent ion ($TPA^+$) disappear in the FTIR spectrum of the air calcined Sil-1-coated SSM. This indicates that the structure directing agent was removed from the pores of Sil-1.

FIGS. 7A-7D are fluorescence microscopy images of self-humidifying membranes prepared from different substrates: (A, C) Sil-1 coated SSM; (B, D) calcined Sil-1-coated SSM and different Nafion precursor: (A, B) Nafion in water and isopropanol; (C, D) Nafion in water and 1,2-propanediol. Full self-humidifying membrane is difficult to form on calcined Sil-1-coated SSM due to its hydrophobic surface property.

(d) Preparation of ZSM-5-Coated SSM (Seeding and Regrowth Method)

The SSM shown in FIG. 2A was cleaned in a series of washing steps designed to remove dirt (i.e., using detergent water), grease and oil (i.e., using acetone), solvent (i.e., using alcohol) and oxides (i.e., using mineral acid (HCl)), before rinsing with water and drying. The clean SSM was sequentially dipped in 1 vol. % 3-mercaptopropyl trimethoxysilane in ethanol for 15 min and 1.6 wt. % TPA-Sil-1 seeds in water for 30 sec., followed by drying at 100° C. for 15 min. The processes of dipping in seeds and drying were repeated at least twice. ZSM-5 was grown on the seeded SSM from synthesis solutions with molar ratio of
1 $SiO_2$:y$Al_2O_3$:0.01-0.5 SDA:500-40,000$H_2O$.

A typical synthesis solution was prepared by dissolving 0.16 ml of 1 mol/l TPAOH and 0.066 g of NaOH in 60 ml of DDI water. Then aluminum hydroxide prepared via the reaction of $Al_2(SO_4)_3 \cdot 18H_2O$ (0.22 g) and excessive ammonia was added little by little into the solution, followed by the slow addition of 1.48 ml of TEOS. The resulting solution was stirred at room temperature for 24 hours to produce a clear and homogeneous synthesis solution with the molar ratio of 1 $SiO_2$:0.05 $Al_2O_3$:0.0125 $TPA_2O$:0.125 $Na_2O$:500$H_2O$. Seeded SSM was positioned vertically in a Teflon® holder. ZSM-5 synthesis solution and seeded SSM were placed in a Teflon®-lined stainless-steel autoclave for hydrothermal regrowth at 150° C. for 48 hours to grow NaZSM-5. The NaZSM-5 film was calcined in air at 550° C. for 6 hours to remove TPAOH in the pores. The samples can be ion-exchanged with 0.5 mol/l $NaNO_3$, $KNO_3$ and $NH_4NO_3$ solutions at room temperature three times, each lasting 3 hours to produce NaZSM-5, KZSM-5 and HZSM-5 after air calcination at 400° C. for 12 hours.

Figure 8A:
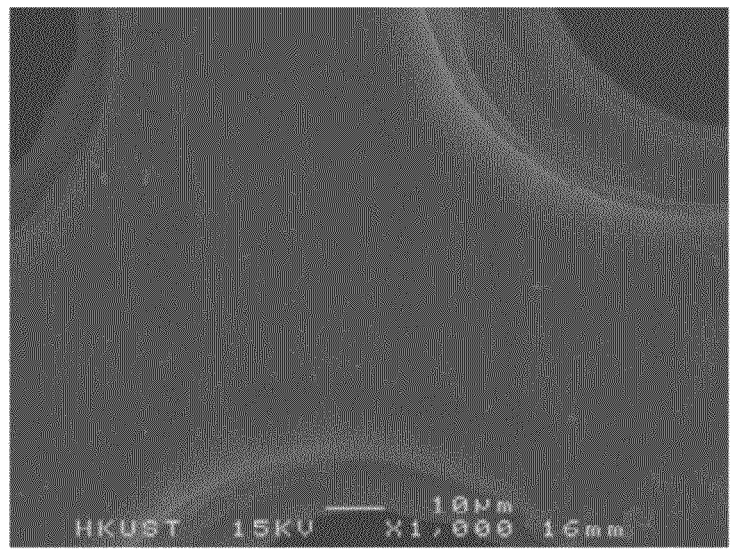
FIGS. 8A and 8B are SEM images of surface and cross-section of calcined zeolite-coated SSM.
Figure 8B:
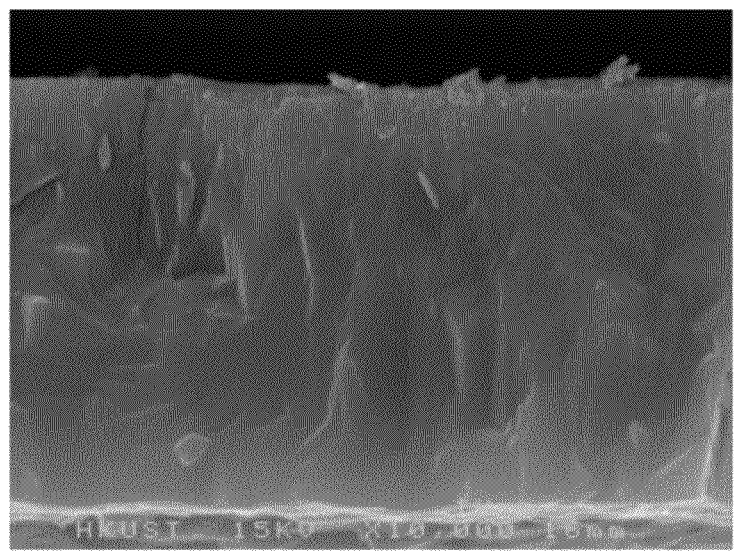

FIGS. 8A and 8B are SEM images of surface and cross-section of calcined ZSM-5-coated SSM. The calcined ZSM-5 coating with the thickness of 7 µm is uniform and well-intergrown.

Figure 9A:
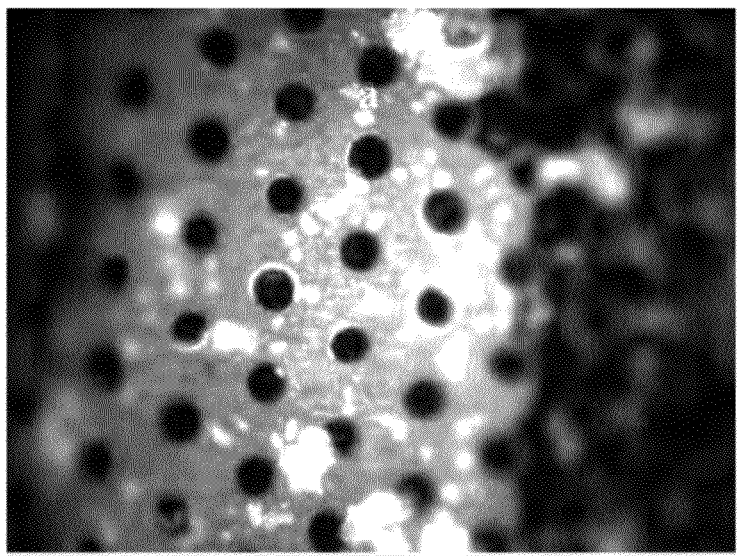
FIGS. 9A-9C are fluorescence microscopy images of self-humidifying membranes prepared from Zeolite Socony Mobil-5 (ZSM-5)-coated SSM and different Nafion precursors: (9A) Nafion in water and dimethyl sulfoxide; (9B) Nafion in water and ethylene glycol; (9C) Nafion in water and 1,2-propanediol.
Figure 9B:
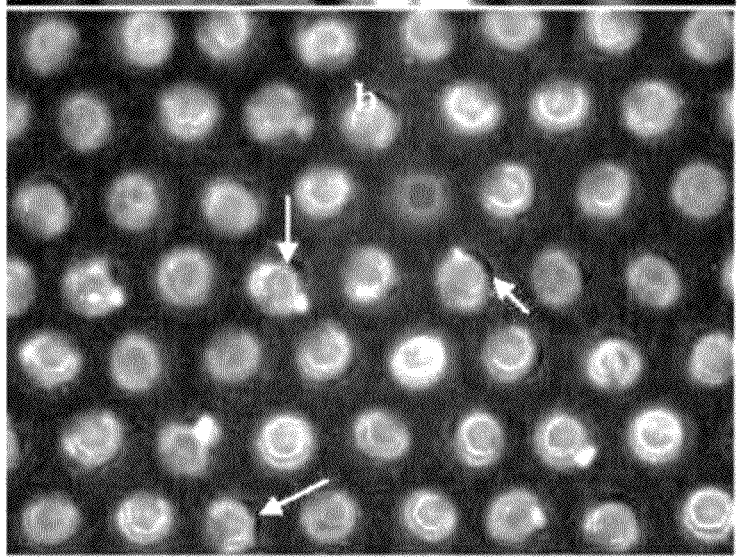
Figure 9C:
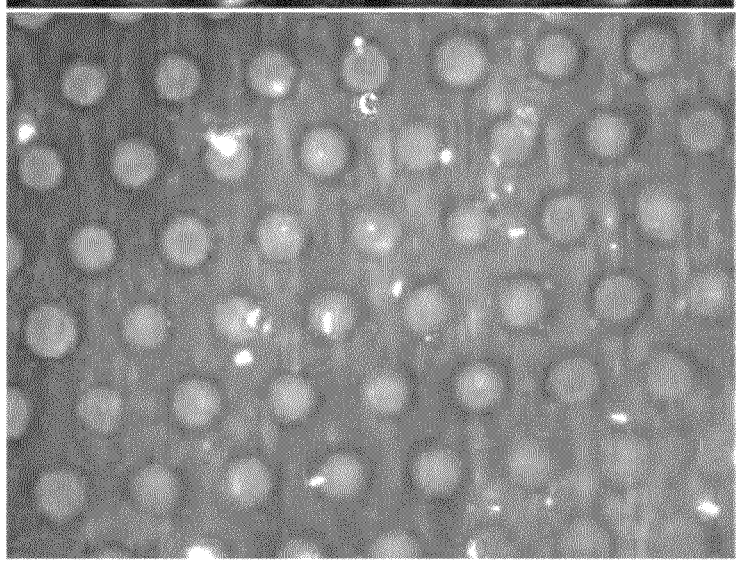

FIGS. 9A, 9B and 9C are fluorescence microscopy images of self-humidifying membranes prepared from ZSM-5-coated SSM and different Nafion precursors. It is noted that casting precursors are Nafion in water and dimethyl sulfoxide, Nafion in water and ethylene glycol and Nafion in water and 1,2-propanediol, respectively. An optimal embodiment was obtained on ZSM-5-coated SSM filled with PSFA using Nafion in water and 1,2-propanediol. Its fluorescence microscopy image shows clearly that polymers filled completely the ZSM-5-coated pores. Adsorption of small solvent molecules (i.e., dimethyl sulfoxide and ethylene glycol) in zeolite pores resulted in preferred surface deposition of Nafion ionomer.

Figure 10A:
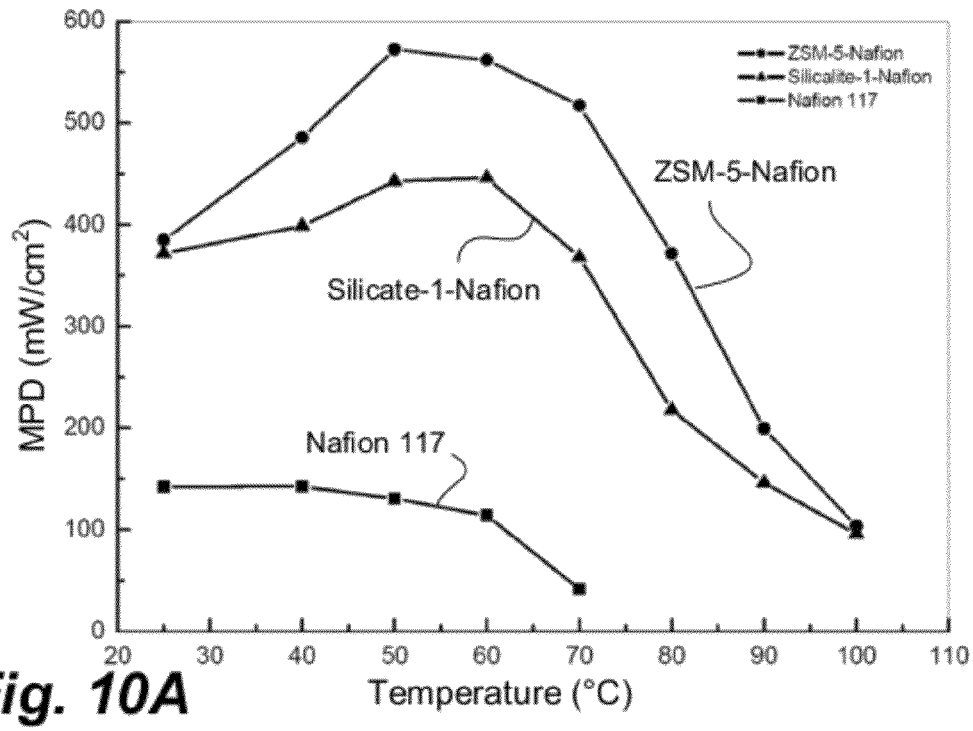
FIGS. 10A and 10B are graphs showing maximum power density (MPD) output from the fuel cells with commercial Nafion 117 membrane and self-humidifying membranes (Nafion/Sil-1-coated SSM and Nafion/ZSM-5-coated SSM) at different operating temperatures under dry $H_2$ and $O_2$ feeds. The I-V, I-P curves at 50° C. (dry conditions) are also included.
Figure 10B:
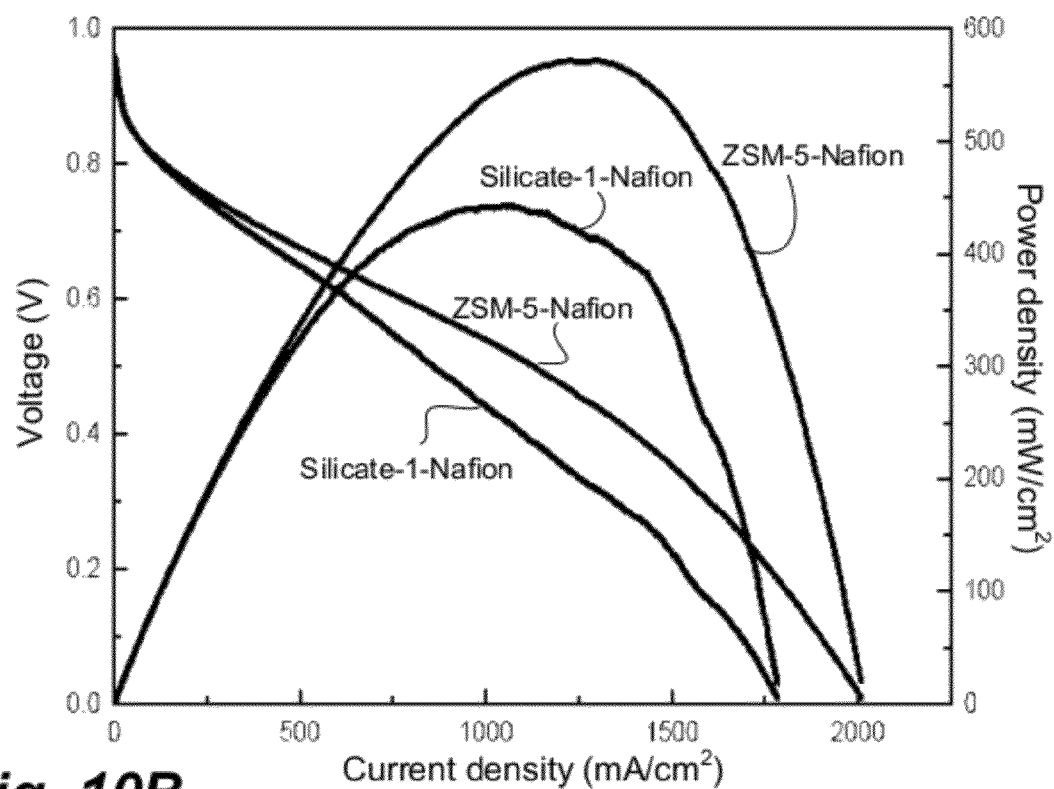

FIGS. 10A and 10B are graphs showing maximum power density (MPD) output from the fuel cells with commercial Nafion 117 membrane and self-humidifying membranes (Nafion/Sil-1-coated SSM and Nafion/ZSM-5-coated SSM) at different operating temperatures under dry $H_2$ and $O_2$ feeds. The I-V, I-P curves at 50° C. (dry conditions) are also included. The fuel cells with self-humidifying membranes gave higher MPD and better performance than standard fuel cell with commercial Nafion 117 membrane in the absence of external humidification.

Figure 11:
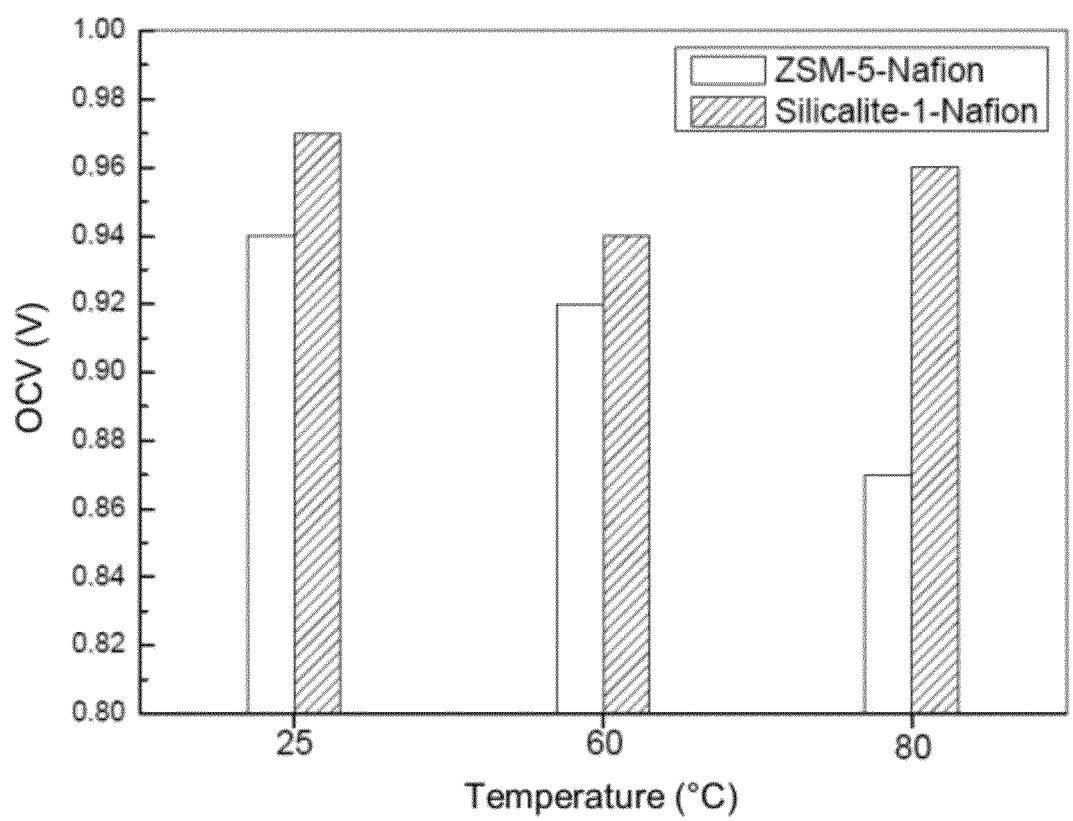
FIG. 11 is a graph showing a comparison of the open circuit voltage (OCV) of the fuel cells with Nafion/Sil-1-coated SSM and Nafion/ZSM-5-coated SSM self-humidifying membranes at different temperatures.

FIG. 11 compares the open circuit voltage (OCV) of the fuel cells with Nafion/Sil-1-coated SSM and Nafion/ZSM-5-coated SSM self-humidifying membranes at different temperatures. Nafion/Sil-1-coated SSM displays higher OCV than Nafion/ZSM-5-coated SSM at all operating temperatures.

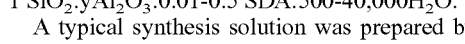

(e) Preparation of MFI-Coated SSM (Seeding and Regrowth Method)

The SSM shown in FIG. 2A was cleaned in a series of washing steps designed to remove dirt (i.e., using detergent water), grease and oil (i.e., using acetone), solvent (i.e., using alcohol) and oxides (i.e., using mineral acid (HCl)), before rinsing with water and drying. The clean SSM was sequentially dipped in 1 vol. % 3-mercaptopropyl trimethoxysilane in ethanol for 15 min and 1.6 wt. % TPA-Sil-1 seeds in water for 30 sec., followed by drying at 100° C. for 15 min. The processes of dipping in seeds and drying were repeated at least twice. MFI were prepared from synthesis mixtures with molar ratio of 1 $SiO_2$:yMO$_x$:0.01-0.5 SDA:500-40,000$H_2O$. Seeded SSM was positioned vertically in a Teflon® holder. The synthesis was carried out at 100-200° C. for 12-100 hours. TS-1-coated SSM was prepared from 1 $SiO_2$:0.01 TEOT: 0.0125 $TPA_2O$:500$H_2O$ at 175° C. for 24 hours. VS-1-coated SSM was prepared from 1 $SiO_2$:0.01 $VOSO_4$:0.0125 $TPA_2O$:500$H_2O$ at 175° C. for 24 hours. Porous MFI were obtained after air calcination at 550° C. for at least 2 hours.

(f) Preparation of LTA-Coated SSM (Seeding and Regrowth Method)

Linde Type A (LTA) is a zeolite framework type that is defined by the Structure Commission of the International Zeolite Association. Common LTA zeolites are KA (3 A molecular sieve), NaA (4 A molecular sieve) and CaA (5 A molecular sieve). The SSM shown in FIG. 2A was cleaned in a series of washing steps designed to remove dirt (i.e., using detergent water), grease and oil (i.e., using acetone), solvent (i.e., using alcohol) and oxides (i.e., using mineral acid (HCl)), before rinsing with water and drying. The clean SSM was sequentially dipped in 1 vol. % 3-mercaptopropyl trimethoxysilane in ethanol for 15 min and 1.6 wt. % NaA seeds in water for 30 sec., followed by drying at 100° C. for 15 min. The processes of dipping in seeds and drying were repeated at least twice. LTA were prepared from synthesis mixtures with molar ratio of 1 $SiO_2$:0.5 $Al_2O_3$:0.5-2 $Na_2O$:40-300$H_2O$. Seeded SSM was positioned vertically in a Teflon® holder. The synthesis was carried out at 80-100° C. for 1-12 hours. NaA-coated SSM was prepared from 1 $SiO_2$:0.5 $Al_2O_3$:1 $Na_2O$:60$H_2O$ at 100° C. for 6 hours. Porous LTA were obtained after air calcination at 550° C. for at least 2 hours.

The samples can be ion-exchanged with 0.5 mol/l $KNO_3$, $NaNO_3$ or $Ca(NO_3)_2$ solutions at room temperature three times, each lasting 3 hours to produce different pore-sized LTA zeolites—KA (0.3 nm), NaA (0.4 nm) and CaA (0.5 nm).

(g) Preparation of Faujasite-Coated SSM (Seeding and Regrowth Method)

The SSM shown in FIG. 2A was cleaned in a series of washing steps designed to remove dirt (i.e., using detergent water), grease and oil (i.e., using acetone), solvent (i.e., using alcohol) and oxides (i.e., using mineral acid (HCl)), before rinsing with water and drying. The clean SSM was sequentially dipped in 1 vol. % 3-mercaptopropyl trimethoxysilane in ethanol for 15 min and 1.6 wt. % FAU (NaY or NaX) seeds in water for 30 sec., followed by drying at 100° C. for 15 min. The processes of dipping into seeds and drying were repeated at least twice. NaY were prepared from synthesis mixtures with molar ratio of 1 $SiO_2$:0.04 $Al_2O_3$:0.88 $Na_2O$:25-50$H_2O$ and NaX were prepared from synthesis mixtures with molar ratio of 1 $SiO_2$:0.15-0.3 $Al_2O_3$:1.0-1.5 $Na_2O$:35-70$H_2O$. Seeded SSM was positioned vertically in a Teflon® holder. The synthesis was carried out at 90-110° C. for 1-24 hours. NaY-coated SSM and NaX-coated SSM were prepared from 1 $SiO_2$:0.04 $Al_2O_3$:0.88 $Na_2O$:40$H_2O$ at 100° C. for 5 hours and 1 $SiO_2$:0.28 $Al_2O_3$:1.4 $Na_2O$:60$H_2O$ at 95° C. for 24 hours. Porous NaY and NaX were obtained after air calcination at 550° C. for at least 2 hours. The samples can be ion-exchanged with 0.5 mol/l $NaNO_3$, $KNO_3$ and $NH_4NO_3$ solutions at room temperature three times each lasting 3 h, followed by calcination again to produce HY and HX zeolites.

(h) Preparation of ALPO-Coated and SAPO-Coated SSM (Direct Synthesis Method)

The SSM shown in FIG. 2A was cleaned in a series of washing steps designed to remove dirt (i.e., using detergent water), grease and oil (i.e., using acetone), solvent (i.e., using alcohol) and oxides (i.e., using mineral acid (HCl)), before rinsing with water and drying. $AlPO_4$-5 was prepared from synthesis mixtures with molar ratio of 1 $Al_2O_3$:1.32$P_2O_5$: 0.5-2 SDA: 50-300$H_2O$ and SAPO-34 were prepared from synthesis mixtures with molar ratio of 1 $SiO_2$:1-5 $Al_2O_3$:1-5$P_2O_5$:0.5-3 SDA:50-300$H_2O$. The clean substrate was immersed in the synthesis solution and aged overnight before placing in an autoclave vessel. The synthesis was carried out at 150-220° C. for 6-100 hours. $AlPO_4$-5-coated SSM and SAPO-34-coated SSM were prepared from 1 $Al_2O_3$: 1.32$P_2O_5$:1 $TEA_2O$:110$H_2O$ at 150° C. for 20 hours and 1 $SiO_2$:1.67 $Al_2O_3$:1.67$P_2O_5$:0.89 $TEA_2O$:93$H_2O$ at 195° C. for 20 hours. (TEA is tetraethylammonium.) Porous $AlPO_4$-5 and SAPO-34 were obtained after air calcination at 550° C. for at least 2 hours.

(i) Preparation of Mesoporous Silica-Coated SSM (Direct Synthesis Method)

The SSM shown in FIG. 2A was cleaned in a series of washing steps designed to remove dirt (i.e., using detergent water), grease and oil (i.e., using acetone), solvent (i.e., using alcohol) and oxides (i.e., using mineral acid (HCl)), before rinsing with water and drying. Mesoporous silica were prepared from synthesis mixtures with molar ratio of 1 $SiO_2$: 0.12-0.37 SDA: 0.0004-0.004HCl: 4.4-8.9 $H_2O$: 10-60 EtOH. (EtOH is ethanol.) SSM was positioned vertically in a Teflon® holder. The synthesis was carried out at 80-120° C. for 12-72 hours. Mesoporous silica-coated SSM was prepared from 1 $SiO_2$:0.2 CTABr:0.004HCl: 5$H_2O$:33 EtOH at 100° C. for 24 hours. (CTABr is cetyltrimethylammonium bromide.) CTABr-free mesoporous silica was obtained after air calcination at 550° C. for at least 2 hours.

(j) Preparation of Dual Layer Zeolite-Coated SSM (Direct Synthesis Method)

The SSM was cleaned in a series of washing steps designed to remove dirt (i.e., using detergent water), grease and oil (i.e., using acetone), solvent (i.e., using alcohol) and oxides (i.e., using mineral acid (HCl)), before rinsing with water and drying. The zeolite synthesis solution was prepared from silica and other metal-containing precursors (e.g., Al, Ti, V) dissolved in water containing structure directing agent. After the deposition of the first layer of the zeolite by hydrothermal synthesis, a second layer of similar or different zeolite structure and composition could be deposited by using a new synthesis solution of similar or different composition. This is illustrated for ZSM-5/Sil-1-coated SSM. First Sil-1-coated SSM was prepared according to the procedure in A-(a). The sample was then rinsed, dried and weighed, before deposition of a ZSM-5 layer according to the procedure in A-(b). Porous zeolites were obtained after air calcination at 550° C. for at least 2 hours.

(k) Preparation of Dual Layer Zeolite-Coated SSM (Seeding and Regrowth Method)

The SSM was cleaned in a series of washing steps designed to remove dirt (i.e., using detergent water), grease and oil (i.e., using acetone), solvent (i.e., using alcohol) and oxides (i.e., using mineral acid (HCl)), before rinsing with water and drying. The clean SSM was sequentially dipped in 1 vol. % 3-mercaptopropyl trimethoxysilane in ethanol for 15 min. and 1.6 wt. % TPA-Sil-1 seeds in water for 30 sec., followed by drying at 100° C. for 15 min. The processes of dipping into seeds and drying were repeated at least twice. The zeolite synthesis solution was prepared from silica and other metal-containing precursors (e.g., Al, Ti, V) dissolved in water containing structure directing agent. After the deposition of the first layer of the zeolite by hydrothermal synthesis, a second layer of similar or different zeolite structure and composition could be deposited by using a new synthesis solution of similar or different composition.

This is illustrated for porous-ZSM-5/nonporous-Sil-1-coated SSM. First Sil-1-coated SSM was prepared according to the procedure in A-(c). The sample was then rinsed, dried and weighed, before deposition of a ZSM-5 layer by a template-free synthesis method. The ZSM-5 was deposited from synthesis solution prepared by adding Ludox SM-30 (14 g) into the mixture of $Al_2(SO_4)_3$.18$H_2O$ (0.583 g), NaOH (1.5 g) and DDI water (48.2 g and 106.5 g for 5 μm and 3 μm-thicked ZSM-5 films, respectively). The synthesis solution was stirred at room temperature for 24 hours, before adding the Sil-1-coated SSM for regrowth. The synthesis was done at 180° C. for 16 hours to deposit a porous NaZSM-5 layer. The porous-NaZSM-5/nonporous-Sil-1-coated SSM was ion-exchanged with 0.05 mol/l $H_2SO_4$ solution at room temperature for 3 times, each lasting 3 hours to obtain a porous-HZSM-5/nonporous-Sil-1-coated SSM.

FIGS. 12A-12C are SEM and EDX elemental mapping images of SSM coated with ZSM-5/Sil-1 dual layer. We can observe clearly double-layered structure of ZSM-5/Sil-1-coated SSM. Thicknesses of ZSM-5 and Sil-1 layers are 5 and 7 μm, respectively. EDX result verifies ultra-low Si/Al ratio (12.4) of ZSM-5 layer, which benefits proton transport through ZSM-5 layer.

Figure 13A:
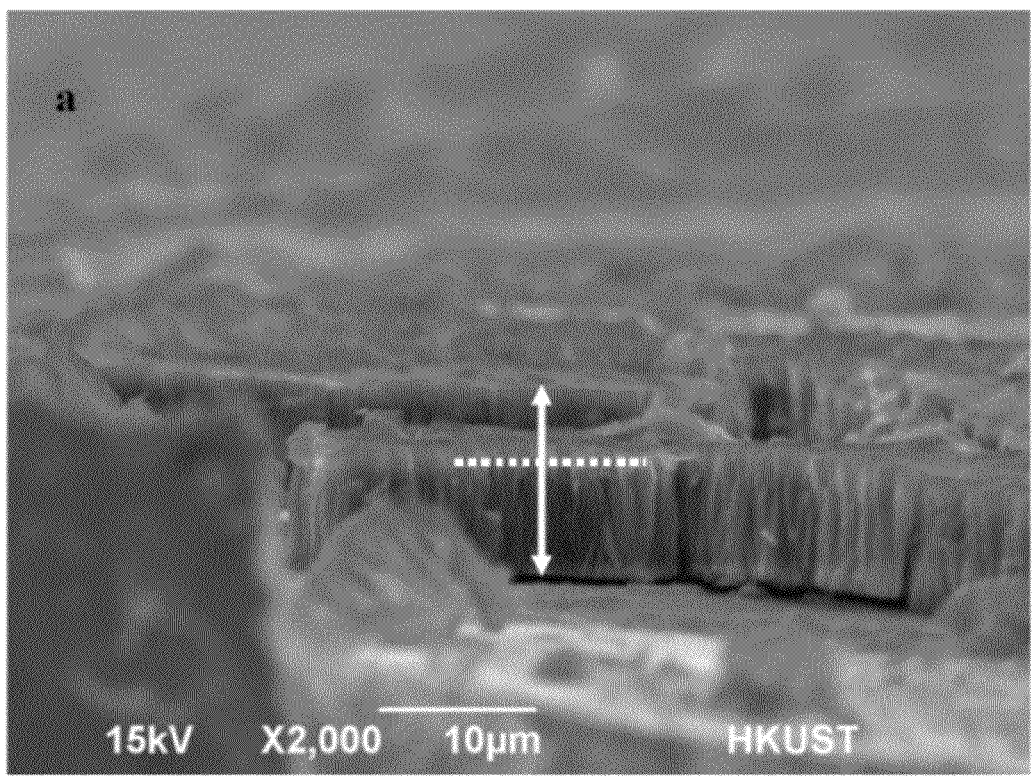
FIGS. 13A and 13B are SEM images of cross-sections of ZSM-5/Sil-1 dual layer-coated SSM.
Figure 13B:
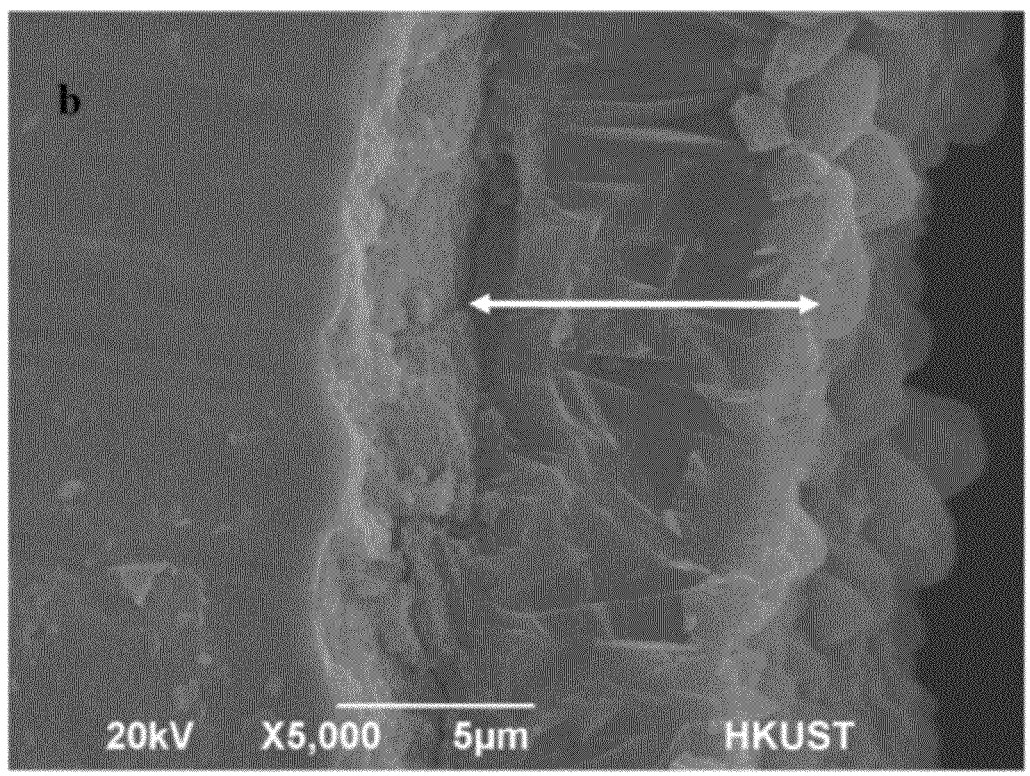
Figure 14A:
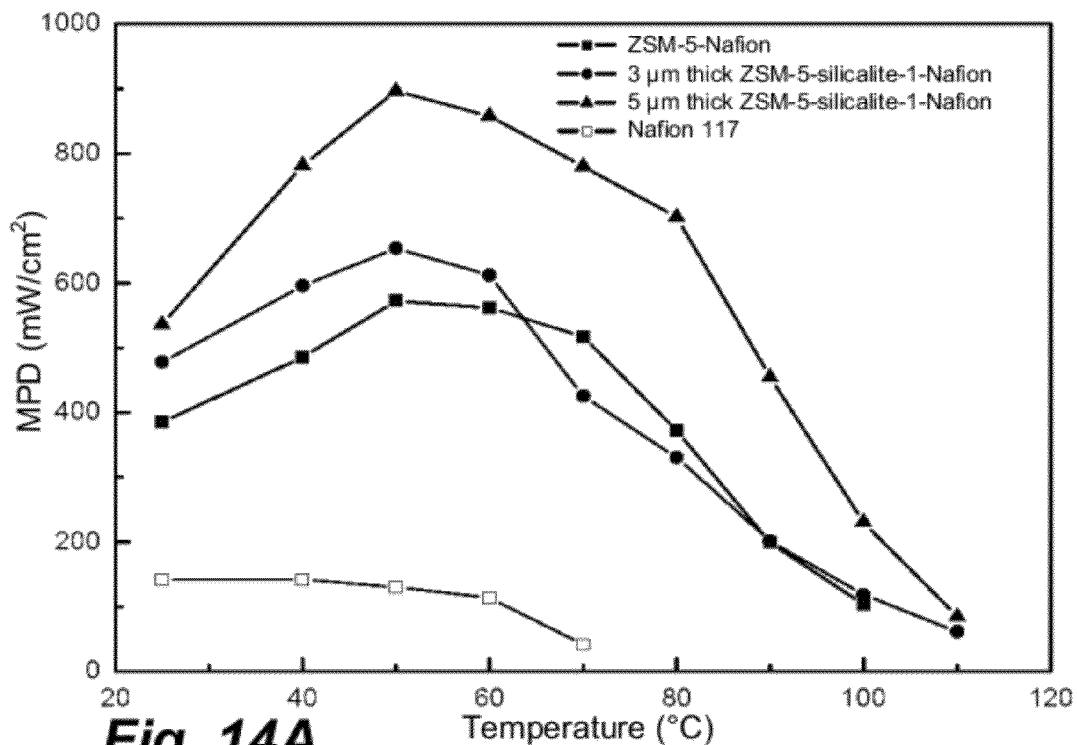
FIGS. 14A and 14B are graphs showing MPD and open circuit voltage (OCV) vs. temperature curves of the fuel cells with Nafion/ZSM-5/Sil-1-coated SSM self-humidifying membranes and other membranes.
Figure 14B:
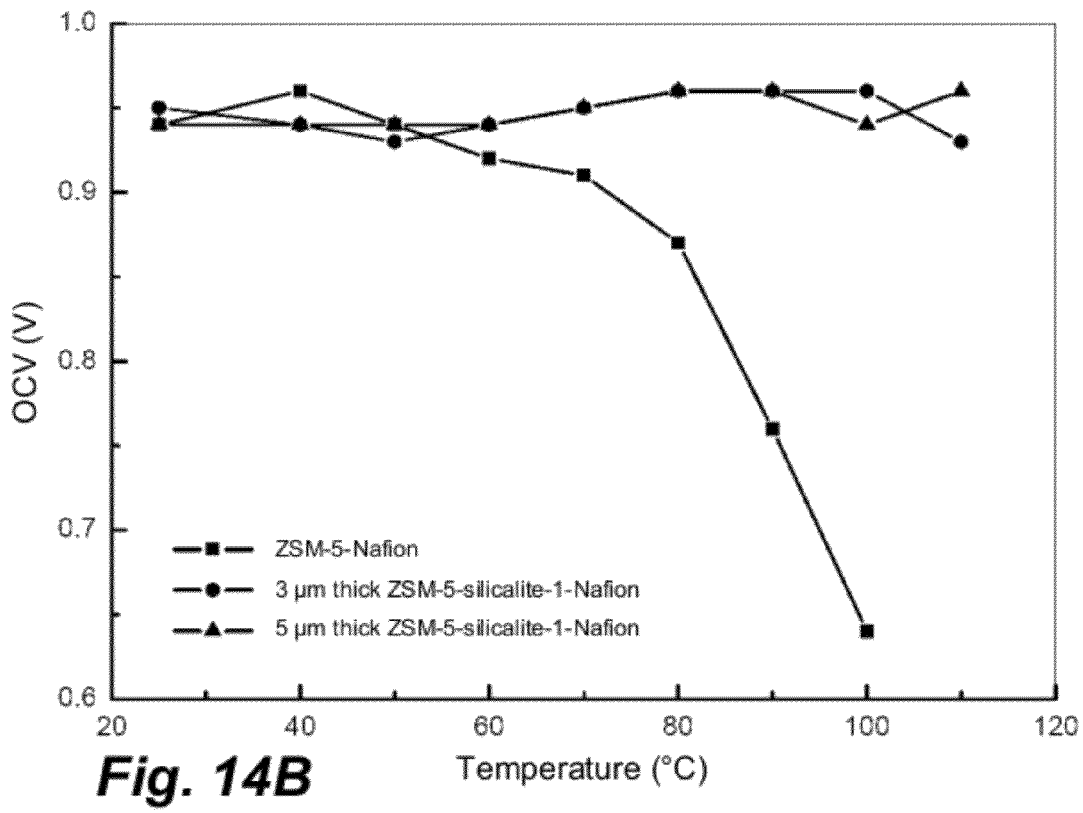

FIGS. 13A and 13B are SEM images of cross-sections of SSM coated with ZSM-5/Sil-1 dual layer. ZSM-5 layers with different thicknesses (5 and 3 μm) can be prepared on Sil-1-coated SSM by using zeolite synthesis solution of different concentration and conducting the synthesis at different temperatures and time durations. FIGS. 14A and 14B presents MPD and open circuit voltage (OCV) vs. temperature curves of the fuel cells with Nafion/ZSM-5/Sil-1-coated SSM self-humidifying membranes and other membranes.

The fuel cell with Nafion/ZSM-5(5 μm)/Sil-1-coated SSM self-humidifying membrane gives better performance than that Nafion/ZSM-5(3 μm)/Sil-1-coated SSM self-humidifying membrane. They give the highest performances at 50° C. and high OCVs of approximately 0.95 V from 25° C. to 100° C., whereas OCV of the fuel cell with Nafion/ZSM-5-coated SSM decreases from 0.94 V at 50° C. to 0.64 V at 100° C. Nonporous Sil-1 layer of ZSM-5/Sil-1-coated SSM hinders effectively current leakage which appears possibly for ZSM-5-coated SSM.

(l) Preparation of Pt/HY Np/Sil-1-Coated SSM (Surface Grafting Method)

Sil-1-coated SSM were prepared by either A-(a) or A-(c) procedures. NaY powder (1 g) was ion-exchanged in 1 mol/l $NH_4NO_3$ (100 ml) at 65° C. for 12 hours before separation by centrifugation and washing to obtain ion-exchanged faujasite Y zeolite. The ion-exchange was repeated at least twice before the powder was recovered, dried and calcined in air at 550° C. for 6 hours to obtain HY zeolite. 0.3 g of HY zeolite was dispersed in 100 ml of DDI water and a calculated amount of aqueous solution of $Pt(NH_3)_4(NO_3)_2$ (0.1 g/ml) was added drop by drop with stirring. Stirring was continued for 10 hours and reduction of the incorporated Pt complex within HY zeolite was carried out using fresh-prepared 0.1 mol/l $NaBH_4$ solution. After 10 hours of stirring, the Pt/HY zeolite was collected via filtration, washed with DDI water and dried under nitrogen flow at 50° C. Sil-1-coated SSM was sequential dipped in 1 vol. % 3-mercaptopropyl trimethoxysilane in ethanol for 15 min and 1.6 wt. % Pt/HY aqueous suspension for 30 sec., followed by drying at 100° C. for 15 min to graft the Pt/HY Np on its pore walls and surface. The processes of dipping into suspension and drying were repeated at least twice.

FIGS. 15A-15F are SEM and EDX elemental mapping images of Pt/HY Np (FIG. 15A), Pt/HY Np/Sil-1-coated SSM (FIGS. 15C, 15D) and Nafion/Pt/HY Np/Sil-1-coated SSM (FIGS. 15B, 15E, 15F). Submicrometer-sized Pt/HY crystals have cubic morphology and 1.8 wt. % Pt content. EDX elemental mapping image of Pt/HY Np/Sil-1-coated SSM (FIGS. 15C, 15D) shows that Pt/HY nanoparticles (i.e., elemental Al) distribute homogeneously on surface of Sil-1-coated SSM via grafting process. From (FIGS. 15B, 15E, 15F), Pt/HY nanoparticles (i.e., elemental Al) within Nafion/Pt/HY Np/Sil-1-coated SSM are absent in the Nafion and are only on pore surface.

Figure 16A:
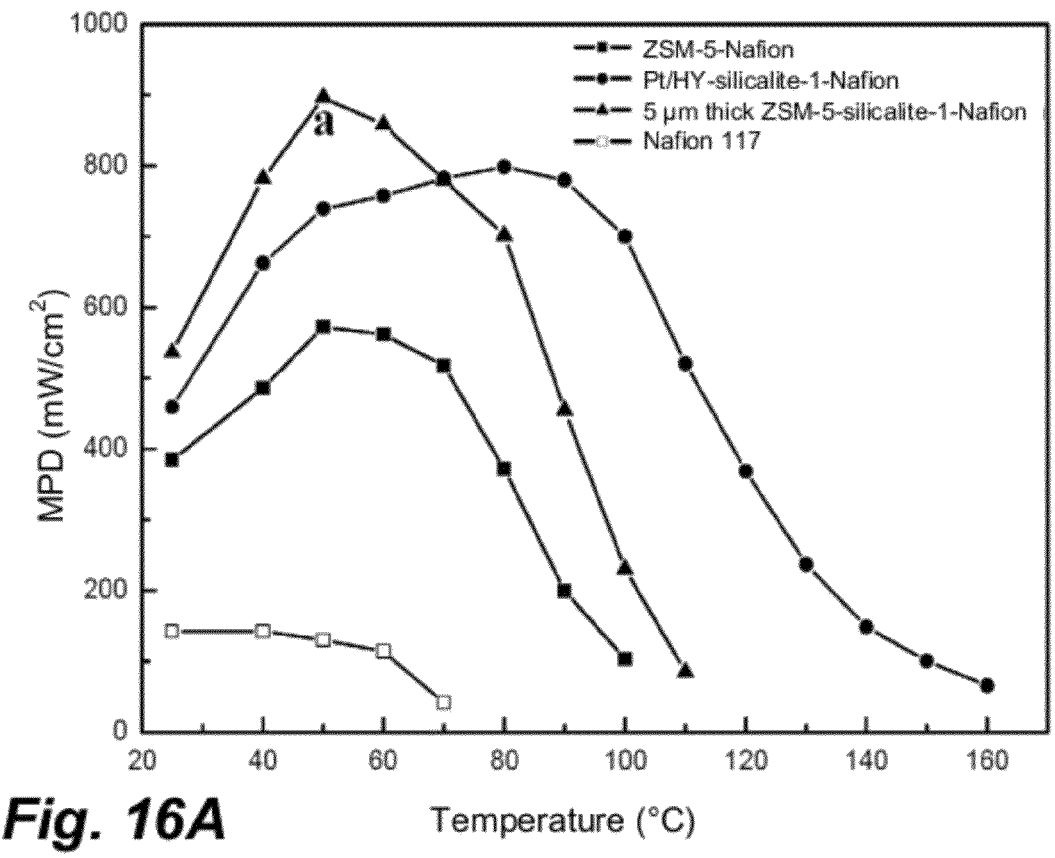
FIGS. 16A and 16B are graphs showing the MPD vs. temperature curves of the fuel cells with Nafion/Pt/HY Np/Sil-1-coated SSM self-humidifying membrane and other membranes. The I-V, I-P curves of initial and cooled fuel cells with Nafion/Pt/HY Np/Sil-1-coated SSM self-humidifying membrane at 25° C. are also included.
Figure 16B:
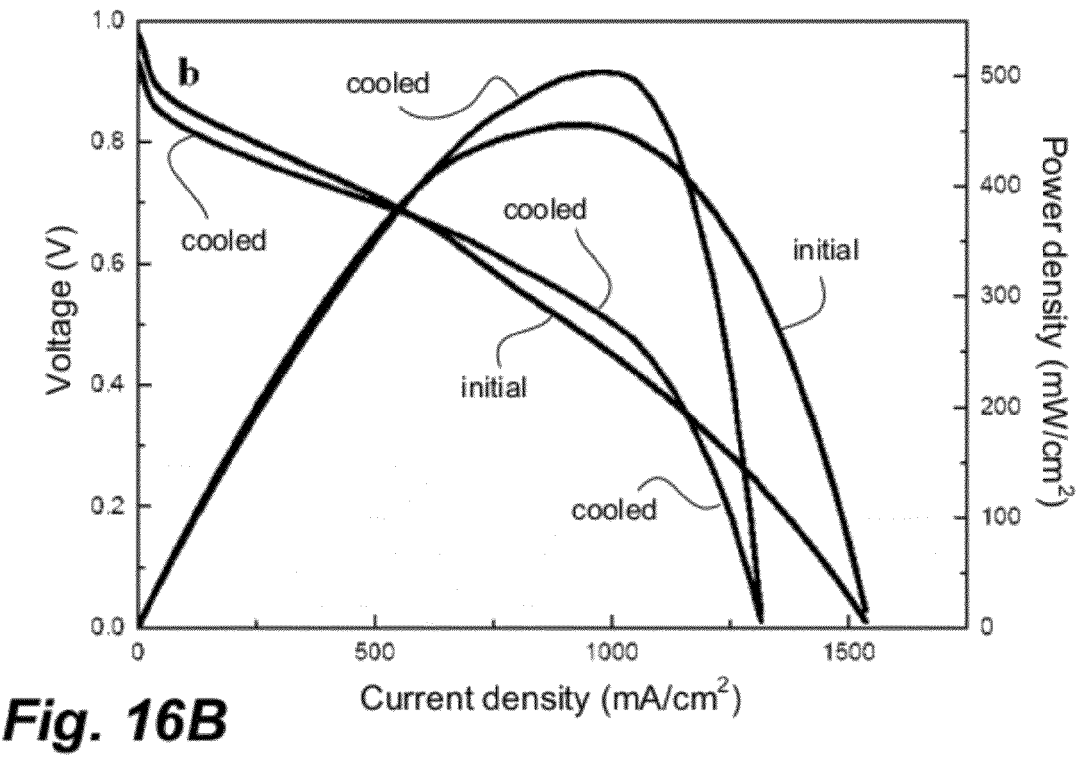

FIG. 16 presents the MPD vs. temperature curves of the fuel cells with Nafion/Pt/HY Np/Sil-1-coated SSM self-humidifying membrane and other membranes. The I-V, I-P curves of initial and cooled fuel cells with Nafion/Pt/HY Np/Sil-1-coated SSM self-humidifying membrane. The data shows that Nafion/Pt/HY Np/Sil-1-coated SSM self-humidifying membrane can maintain high MPD at higher temperature than Nafion 117, Nafion/ZSM-5-coated SSM and Nafion/ZSM-5/Sil-1-coated SSM. The membrane can tolerate operation up to 160° C. without apparent lost in performance as indicated by the performance comparison between initial and cooled fuel cells.

Figure 17:
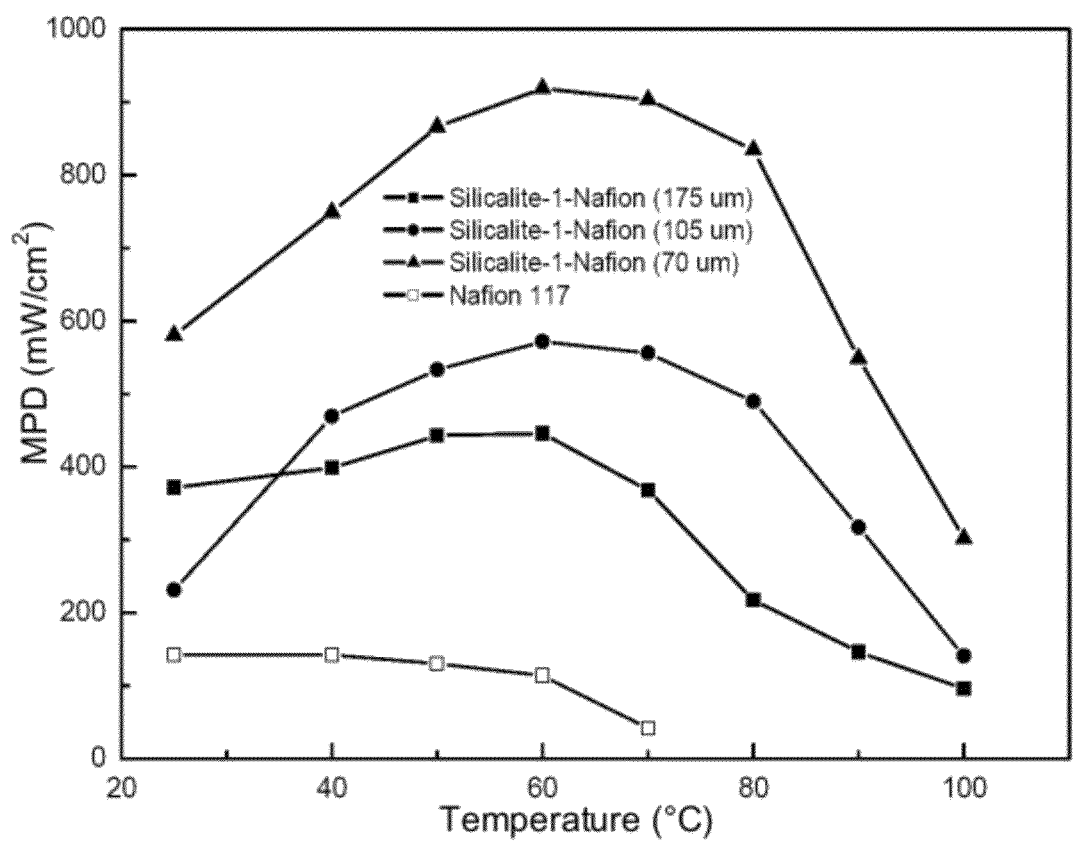
FIG. 17 is a graph showing the MPD vs. temperature curves of the fuel cells with Nafion/Sil-1-coated SSM self-humidifying membranes of different thicknesses.

FIG. 17 presents the MPD vs. temperature curves of the fuel cells with Nafion/Sil-1-coated SSM self-humidifying membranes of different thicknesses. The result shows increased MPD and performance with decreasing membrane thickness.

(m) Preparation of NaA (NaX)/Sil-1-Coated SSM (Dip-Coating Method)

Sil-1-coated SSM were prepared by either A-(a) or A-(c) procedures. NaA or NaX zeolite powders (0.75 g) were dissolved into 2.5 mol/l $H_2SO_4$ solutions (4.25 g) to prepare zeotype or zeolite nanoblock suspensions. The zeotype or zeolite nanoblock were coated onto the Sil-1-coated SSM by dipping substrate into diluted zeotype/zeolite nanoblock suspensions for 30 sec. The coated sample was dried at 100° C. for 15 min. The processes of dipping and drying were repeated for at least twice.

Figure 18A:
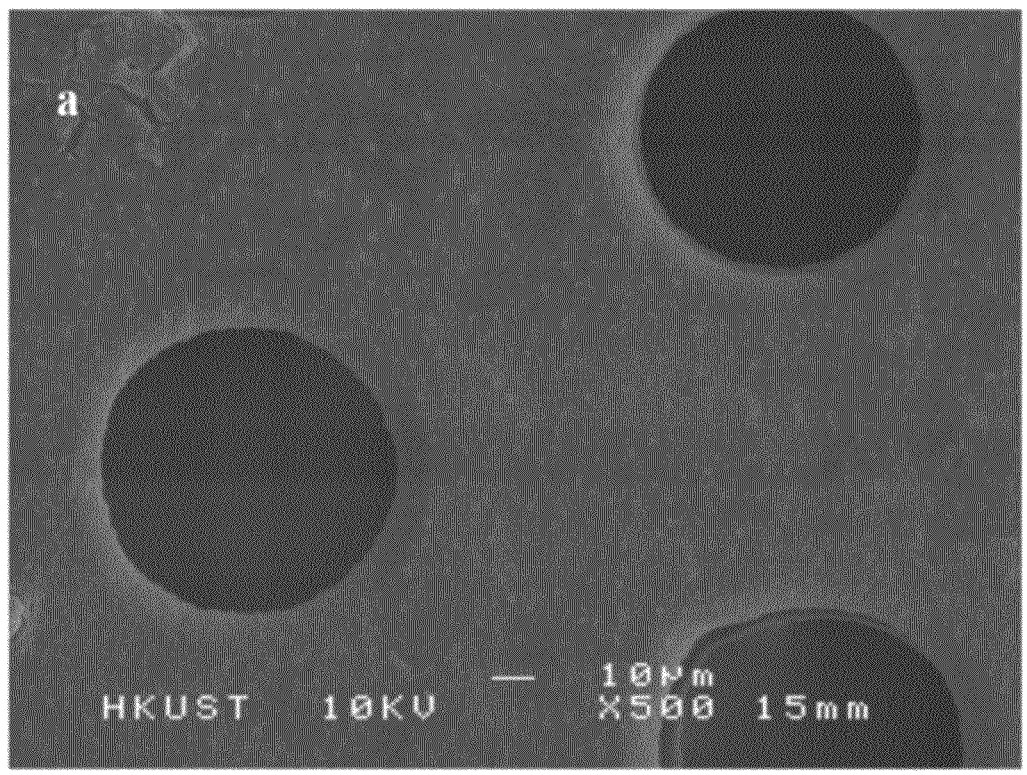
FIGS. 18A and 18B are SEM images of dual layer NaA/Sil-1-coated SSM and NaX/Sil-1 coated SSM.
Figure 18B:
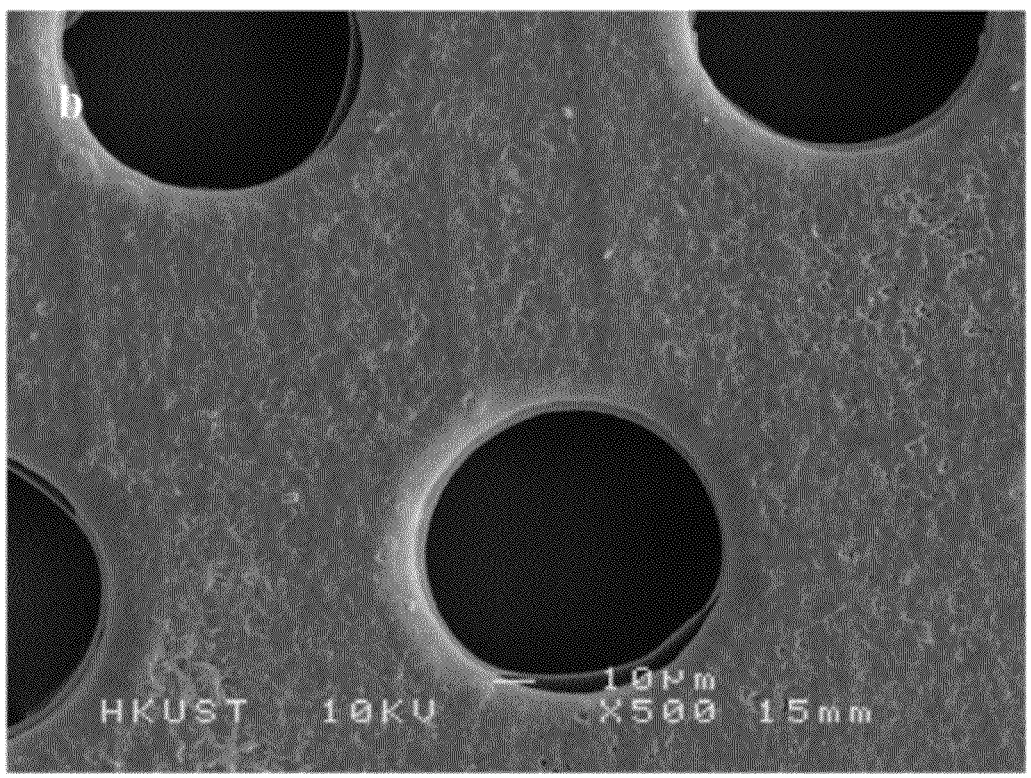

FIGS. 18A and 18B are SEM images of dual layer NaA/Sil-1-coated SSM and NaX/Sil-1-coated SSM. The NaA/Sil-1-coated SSM and NaX/Sil-1-coated SSM have Si/Al ratios of 25.4 and 69.0, respectively.

(n) Preparation of Porous Substrate

The procedures established in A-(a) to A-(m) can be implemented on various substrates other than the stainless steel to include metals, glasses, ceramics and plastics with straight and tortuous pores. Examples include but not limited to (1) metal foams (i.e., nickel and nickel alloy foam), (2) etched porous metals, (3) porous metals, (4) porous carbon/graphite, (5) ceramic foams, (6) porous ceramics, (7) track etched polymers and plastics, (8) porous plastics, (9) sintered glasses. The pore size of porous substrate as used herein is in the range of 20 nanometers to 500 micrometers.

B. Preparation of Self-Humidifying Membrane (a) Preparation of PFSA/Zeolitic Material-Coated SSM Proton-conducting polymers were confined within the zeolitic material-coated porous substrates. Examples were shown for PFSA membrane, the most common proton-conducting polymer used in PEMFC. PFSA precursor was prepared by mixing 5 wt. % PFSA resin suspension in water and solvents with 1:1 to 1:10 volume ratios. The zeolitic material-coated SSM was then impregnated with PFSA precursor, vacuum dried at 80° C. to remove solvents. The procedure is repeated until the pores are filled.

(b) Preparation of Sulfonated Polyetherketone/Zeolitic Material-Coated SSM

Sulfonated polyetherketone precursor was prepared by dissolving sulfonated polyetherketone into dimethyl sulfoxide. The zeolitic material-coated SSM was then impregnated with sulfonated polyetherketone precursor, vacuum dried at 80° C. to remove solvents. The procedure is repeated until the pores are filled.

(c) Preparation of Sulfonated Chitosan/Zeolitic Material-Coated SSM

Chitosan precursor was prepared by dissolving chitosan into 2 wt. % acetic acid solution at 80° C. The zeolitic material-coated SSM was then impregnated with chitosan precursor, vacuum dried at 25° C. to remove solvents. The procedure is repeated until the pores are filled. The chitosan/zeolitic material-coated SSM was immersed in 2 mol/l $H_2SO_4$ solution for 24 hours to allow chitosan cross-linking, followed by washing with DDI water and vacuum drying at 25° C. to obtain sulfonated chitosan/zeolitic material-coated SSM.

C. Characterization (a) X-ray Diffraction (XRD)

XRD was used to verify the existence and crystallographic orientation of zeolite coating. XRD patterns of SSM and zeolite-coated SSM were collected with a PANalytical X'pert Pro X-ray diffractometer with Cu Kα radiation under the step size of 0.05°. Plate-like samples were placed horizontally on special-designed holder in order to obtain high intensity signal of thin film by using low X-ray incidence angle.

(b) Fourier Transform Infrared (FTIR) Spectroscopy

FTIR was used to confirm complete removal of structure-directing agent in zeolitic channels. FTIR spectra of thin film samples were recorded using a Perkin-Elmer FTIR microscopy system with liquid nitrogen cooled mercury cadmium telluride (MCT) detector. Zeolite-coated SSM was placed horizontally on a glass slide and SSM was used as background. Appropriate areas were selected under optical microscopy mode, followed by measuring their FTIR spectra under IR mode using the following conditions: resolution of 4 $cm^{-1}$, scan time of 256, and scan range from 4000 to 400 $cm^{-1}$.

(c) Fluorescence Microscope

Olympus BX41 Microscope with fluorescence accessories was used to observe integrity of self-humidifying membrane based on the fact that SSM and zeolite don't generate fluorescence signals under ultraviolet light.

(d) Scanning Electron Microscope (SEM) and Energy Dispersive X-Ray (EDX)

SEM and EDX elemental mapping images were made using a JEOL JSM-6300F and JSM-6390 scanning electron microscope equipped with energy dispersive X-ray detector.

D. Fuel Cell (a) Membrane-Electrode Assembly (MEA)

Porous stainless steel plates coated with gold layers were used as current collectors and gas diffusion layers. They were brushed with the slurry containing 20 wt. % Pt on Vulcan XC-72 and 10 wt. % Nafion resin suspension, followed by drying at 80° C. for 1 hour to obtain electrodes with Pt loading content of 0.5 mg/$cm^2$. Self-humidifying membrane was hot-pressed between two pieces of porous stainless steels with Pt/C catalyst layers at 130° C. under 10 MPa pressure for 3 min to prepare MEA.

(b) Performance Testing

MEA performance was tested in home-made testing equipment. Dry UHP-grade hydrogen and oxygen with the flow rate of 10 $cm^3$/min (STP) were supplied to anode and cathode of MEA through special-designed tubes, respectively. The fuel cell was firstly stabilized under open circuit condition at room temperature overnight, followed by testing its I-V curve at room temperature. Then operating temperature of fuel cell was elevated slowly to certain points for testing its performances. The fuel cell was stabilized for at least 1 hour at every temperature point. Open circuit voltage (OCV) vs. time and I-V curves of MEA were recorded by CHI 660C electrochemical station connected with CHI 680 Amp Booster.

Table 1 lists preparation parameters and physicochemical properties of different self-humidifying membranes, which involve a series of membranes with different Si/Al ratios (pure silica, high silica and low silica zeolites), structures (single and double layered zeolites) and thicknesses (70, 105 and 175 μm).

Conclusion

It will be understood that many additional changes in the details, materials, steps and arrangement of parts, which have been herein described and illustrated to explain the nature of the subject matter, may be made by those skilled in the art within the principle and scope of the invention as expressed in the appended claims.

TABLE 1

| Composite membrane | Synthesis solution of zeolite film | Hydrothermal conditions of zeolite film | Nafion precursor | Si/Al ratio | Pt content | Membrane Thickness |
|---|---|---|---|---|---|---|
| Silicalite-1-Nafion | 1TEOS:0.125TPAOH: 250$H_2O$ | 130° C., 48 h | 1.7% (w/v) Nafion, 3 times casting | ∞ | N/A | 175 μm |
| ZSM-5-Nafion | 1TEOS:0.1Al(OH)$_3$: 0.025TPAOH: 0.25NaOH:500$H_2O$ | 150° C., 48 h | 1.7% (w/v) Nafion, 3 times casting | 94.2 (EDX) 15.3 (XPS) | N/A | 175 μm |
| 3 um ZSM-5-silicalite-1-Nafion | 1Si$O_2$:0.0125Al$_2O_3$: 0.535NaOH:92$H_2O$ | 180° C., 16 h | 1.7% (w/v) Nafion, 3 times casting | 20.3 (EDX) | N/A | 175 μm |
| 5 um ZSM-5-silicalite-1-Nafion | 1Si$O_2$:0.0125Al$_2O_3$: 0.535NaOH:46$H_2O$ | 180° C., 16 h | 1.7% (w/v) Nafion, 3 times casting | 12.4 (EDX) | N/A | 175 μm |
| Pt/HY-silicalite-1-Nafion | 1TEOS:0.125TPAOH: 250$H_2O$ | 130° C., 48 h | 1.7% (w/v) Nafion, 3 times casting | 2.7 (EDX) for Pt/HY | 0.3 wt ‰ of Nafion | 175 μm |
| Silicalite-1-Nafion (thin 1) | 1TEOS:0.125TPAOH: 250$H_2O$ | 130° C., 48 h | 1.7% (w/v) Nafion, 1 time casting | ∞ | N/A | 105 μm |
| Silicalite-1-Nafion (thin 2) | 1TEOS:0.125TPAOH: 250$H_2O$ | 130° C., 48 h | 1.0% (w/v) Nafion, 3 times casting | ∞ | N/A | 70 μm |

What is claimed is:

1. A method of producing a self-humidifying membrane used in a self-humidifying fuel cell, the method comprising:

preparing a porous substrate with straight and tortuous pores having a pore size of 20 nanometers to 500 micrometers;

coating the porous substrate with a continuous or non-continuous zeolitic material layer with a thickness of 0.1 to 100 micrometers selected from the group consisting of zeolites, molecular sieves and zeotypes to form zeolitic material-coated pore walls and surface, using a process selected at least one of the group consisting of direct synthesis, seeding and regrowth, surface grafting and dip-coating;

filling the zeolitic material-coated pores with at least one proton-conducting material to form a structure for a self-humidifying membrane by impregnating the zeolitic material-coated pore walls and surface with a filling material containing the at least one proton-conducting material and solvents, vacuum drying sufficiently to remove the solvents, and repeating the impregnating and vacuum drying to completely fill the pores with the at least one proton-conducting material; and activating the structure, wherein the activating comprises removing solvents in the proton-conducting material precursors and porous structures of the zeolites, molecular sieves or zeotype materials to make the membrane self-humidifying, the zeolite, zeotype and/or molecular sieve regulates water within the self-humidifying membrane through adsorption of reaction generated water and/or catalytic formation of water, the filling the zeolitic material-coated pores with at least one proton-conducting material comprises preparing a subsequent precursor, said subsequent precursor comprising a sulfonated polymer precursor by use of a precursor having a solvent comprising at least one material selected from the group consisting of isopropanol, dimethyl sulfoxide, ethylene glycol, 1,2-propanediol and glycerol, followed by said vacuum drying, to form a confined proton-conducting polymer, the proton-conducting polymer confined within the coated pores in a configuration that limits shrinkage and swelling of the material caused by temperature changes and thermal effects, thereby improving mechanical and dimensional stabilities at high temperature, and the confinement induces rearrangement of the polymer chain and functional group conformation within the pores.

2. The method according to claim 1, wherein a porous substrate comprises straight or tortuous pore channels on a flat metal, ceramic, plastic, carbon or glass substrate material.

3. The method according to claim 2, further comprising forming the porous substrate with a thickness in the range of 10 to 1000 micrometers.

4. The method according to claim 2, further comprising forming the porous substrate with a thickness in the range of 50 to 200 micrometers.

5. The method according to claim 1, wherein said zeolitic material consists of at least one of the group selected from LTA, MFI, FAU zeolite, molecular sieve including the family of mesoporous silica and extra-large pore molecular sieve and zeotype.

6. The method according to claim 1, further comprising using the proton-conducting material as a material selected from the group consisting of perfluorosulphonic acid polymer, sulfonated polyetherketone and sulfonated chitosan.

7. The method according to claim 1, comprising using a particle size of zeolitic material particles at below one micrometer.

8. A method of producing a self-humidifying fuel cell, comprising:
    using the resulting self-humidifying membrane produced by the method of claim 1 as self-humidifying proton-conducting membrane in the fuel cell.

9. A self-humidifying fuel cell, comprising a self-humidifying membrane produced by the method of claim 1, further comprising:
    an anode gas diffusion layer and a catalytic layer adjacent the anode gas diffusion layer; and
    a cathode gas diffusion layer and a catalytic layer close to the cathode gas diffusion layer.

10. The method according to claim 1, wherein the filling the zeolitic material-coated pores with at least one proton-conducting material comprises preparing PFSA precursor as a PFSA resin suspension in water and solvents.

11. The method according to claim 1, wherein the filling the zeolitic material-coated pores with at least one proton-conducting material comprises preparing sulfonated polyetherketone precursor as a sulfonated polyetherketone solution.

12. A self-humidifying membrane as used in a self-humidifying fuel cell, which comprises:
    a continuous or non-continuous zeolite, zeotype and/or molecular sieve-coated porous substrates having a pore size of 20 nanometers to 500 micrometers; and
    a proton-conducting material filled into the coated porous substrate, to form a confined proton-conducting polymer, wherein:
    the zeolite, zeotype and/or molecular sieve regulates water within the self-humidifying membrane through adsorption of reaction generated water and/or catalytic formation of water,
    the proton-conducting polymer confined within the coated pores in a configuration that limits shrinkage and swelling of the material caused by temperature changes and thermal effects, thereby improving mechanical and dimensional stabilities at high temperature, and
    the confinement induces rearrangement of the polymer chain and functional group conformation within the pores.

13. A proton exchange membrane fuel cell (PEMFC) comprising:
    a self-humidifying electrolyte membrane, formed by confinement of a proton-conducting polymer within a zeolite, zeotype and/or molecular sieve coated porous substrate, the confinement further comprising:
    preparing a porous substrate with straight and tortuous pores having a pore size of 20 nanometers to 500 micrometers;
    coating the porous substrate with a continuous or non-continuous zeolitic material layer with a thickness of 0.1 to 100 micrometers selected from the group consisting of zeolites, molecular sieves and zeotypes to form zeolitic material-coated pore walls and surface, using a process selected at least one of the group consisting of direct synthesis, seeding and regrowth, surface grafting and dip-coating;
    filling the zeolitic material-coated pores with at least one proton-conducting polymer to form a structure for a self-humidifying membrane by impregnating the zeolitic material-coated pore walls and surface with a filling material containing the at least one proton-conducting material and solvents, vacuum drying sufficiently to remove the solvents, and repeating the impregnating and vacuum drying to completely fill the pores the at least one proton-conducting material; and
    activating the structure, wherein
    the activating comprises removing solvents in the proton-conducting material precursors and porous structures of the zeolites, molecular sieves or zeotype materials to make the membrane self-humidifying,
    the zeolite, zeotype and/or molecular sieve regulates water within the self-humidifying membrane through adsorption of reaction generated water and/or catalytic formation of water,
    the filling the zeolitic material-coated pores with at least one proton-conducting material comprises preparing a subsequent precursor, said subsequent precursor comprising a sulfonated polymer precursor by use of a precursor having a solvent comprising at least one material selected from the group consisting of isopropanol, dimethyl sulfoxide, ethylene glycol, 1,2 propanediol and glycerol, followed by said vacuum drying, to form a confined proton-conducting polymer,
    the proton-conducting polymer confined within the coated pores in a configuration that limits shrinkage and swelling of the material caused by temperature changes and thermal effects, thereby improving mechanical and dimensional stabilities at high temperature, and
    the confinement induces rearrangement of the polymer chain and functional group conformation within the pores.

14. A method of producing a self-humidifying membrane used in a self-humidifying fuel cell, the method comprising:
    preparing a porous substrate;

coating the porous substrate with a zeolitic material selected from the group consisting of zeolites, molecular sieves and zeotypes to form zeolitic material-coated pore walls and surface;

filling the zeolitic material-coated pores with at least one proton-conducting material to form a structure for a self-humidifying membrane by impregnating the zeolitic material-coated pore walls and surface with a filling material containing the at least one proton-conducting material and solvents, vacuum drying sufficiently to remove the solvents, and repeating the impregnating and vacuum drying to fill the pores with the at least one proton-conducting material; and activating the structure, wherein the filling the zeolitic material-coated pores with at least one proton-conducting material comprises preparing a chitosan precursor, immersing in an $H_2SO_4$ solution for sufficient time to allow filled chitosan cross-linking, followed by washing with water and said vacuum drying.

* * * * *